United States Patent

Trost et al.

[15] 3,675,209

[45] July 4, 1972

[54] AUTONOMOUS MULTIPLE-PATH INPUT/OUTPUT CONTROL SYSTEM

[72] Inventors: Joseph C. Trost, Hatboro; Robert V. Bock, Malvern; Frederick H. Gerbstadt, Berwyn; William J. Graham, Drexel Hills; Wilson D. Miles, West Chester; Charles R. Questa, King of Prussia, all of Pa.

[73] Assignee: Burroughs Corporation, Detroit, Mich.

[22] Filed: Feb. 6, 1970

[21] Appl. No.: 9,275

[52] U.S. Cl. ....................340/172.5

[51] Int. Cl. ....................G06f 3/00

[58] Field of Search ....................340/172.5

[56] References Cited

UNITED STATES PATENTS

| | | | |
|---|---|---|---|
| 3,200,380 | 8/1965 | MacDonald et al. | 340/172.5 |
| 3,274,561 | 9/1966 | Hallman et al. | 340/172.5 |
| 3,406,380 | 10/1968 | Bradley et al. | 340/172.5 |
| 3,409,880 | 11/1968 | Galler et al. | 340/172.5 |
| 3,416,139 | 12/1968 | Marx | 340/172.5 |
| 3,432,813 | 3/1969 | Annunziata et al | 340/172.5 |
| 3,475,729 | 10/1969 | Procelli et al | 340/172.5 |

*Primary Examiner*—Paul J. Henon
*Assistant Examiner*—Sydney R. Chirlin
*Attorney*—Paul W. Fish, Edward J. Feeney and Charles S. Hall

[57] ABSTRACT

A multiple channel input/output channel system for information processing systems, including one or more control modules each having a unit for translating program elements, modular data service apparatus controlled by I/O data transfer descriptors provided by the translational unit, and a memory interface unit for controlling the transfer of information between the translator and data service units and a data processing system memory. The translator unit asynchronously obtains I/O program words or elements from the processing system and combines designated portions of them to form data transfer descriptors for input/output tasks to be done. The data service apparatus interfaces with a plurality of peripheral control units which are coupled for controlling peripheral input/output devices either directly or via multiple-path peripheral exchange units.

20 Claims, 27 Drawing Figures

INVENTORS.
JOSEPH C. TROST, ROBERT V. BOCK,
FREDERICK H. GERBSTADT, WILLIAM J. GRAHAM,
WILSON D. MILES, CHARLES R. QUESTA

BY George L. Kensinger
ATTORNEY

INVENTORS.
JOSEPH C. TROST, ROBERT V. BOCK,
FREDERICK H. GERBSTADT, WILLIAM J GRAHAM,
WILSON D. MILES, CHARLES R. QUESTA
BY George L. Kensinger
ATTORNEY INVENTORS.
JOSEPH C. TROST, ROBERT V. BOCK,
FREDERICK H. GERBSTADT, WILLIAM J. GRAHAM,
WILSON D. MILES, CHARLES R. QUESTA
BY George L. Kensinger
ATTORNEY INVENTORS
JOSEPH C. TROST, ROBERT V. BOCK,
FREDERICK H. GERBSTADT, WILLIAM J. GRAHAM,
WILSON D. MILES, CHARLES R. QUESTA
BY George L. Kensinger
ATTORNEY INVENTORS.
JOSEPH C. TROST, ROBERT V. BOCK,
FREDERICK H. GERBSTADT, WILLIAM J. GRAHAM,
WILSON D. MILES, CHARLES R. QUESTA
BY George L. Kensinger
ATTORNEY

AUTONOMOUS MULTIPLE-PATH INPUT/OUTPUT CONTROL SYSTEM

BACKGROUND OF THE INVENTION

Several data processing systems have incorporated separate data processor units and input/output (I/O) control apparatus independently capable of accessing a system memory for processing stored data and controlling input/output data transfers in parallel. Some of these systems have been provided with separate specially programmed "satellite" computer systems for independent control of input/output information transfers. Other systems have utilized an independently functioning input/output control unit as described in Hallman et al., U.S. Pat. No. 3,274,561, issued Sept. 20, 1966, or an input/output computer module programmed from the system memory as described in Bradley et al. U.S. Pat. No. 3,406,380, issued Oct. 15, 1968.

In order to increase the operating capability of such systems it has become desirable to increase the degree of parallelism between the data processing and input/output control units by releasing the processor units from I/O operations earlier in each process. Also, data throughput in these systems can be increased if the selection or binding of alternate data transfer paths in the I/O system is delayed until initiate time, thus maximizing input/output channel activity. This involves delayed selection of one of several alternate data paths through the I/O control modules, the input/output channels, the peripheral device controllers and the peripheral exchanges coupled to the devices.

A simplified input/output control module less complex than that of the above-mentioned Bradley et al., U.S. Pat. No. 3,406,380 without undue loss in flexibility or operation speed, has also been needed. Such an improved control module should be capable of automatically responding in a simplified manner to input/output program elements stored in a system memory for constructing I/O control words or descriptors to be executed.

One approach to increasing the data throughput in information processing systems is to put the selection or binding of alternate data transfer paths in the I/O subsystem under the control of the system control program and the data processor unit(s). This, however, has the disadvantage of decreasing the degree of parallelism between the data processor and input/output control units since the processor must be interrupted at the initiate time of each I/O operation for data path selection.

SUMMARY OF THE INVENTION

Accordingly, it is an object of this invention to provide a data processor input/output system including a control module capable of independently selecting optimum data paths to input/output devices for information transfers.

Another object of this invention is to increase data throughput in information processing systems by delaying until initiate time the selection and binding of alternate data transfer paths under autonomous control of an input/output system.

A further objective is to provide an efficient input/output control module which is independent of the main processor with respect to the data service input/output operations of the system. This capability is provided by a translator unit which is a special purpose processor having the ability to perform a limited number of hard-wired microsequences. The control module processor functions are the following:

1. asynchronous selection of input/output job requests from a shared I/O map in the system "level 1" memory. The I/O map is serviced by the associated input/output control modules independent of system processor operations.

2. completion of device-to-device I/O transfers (read tape to disk, read card to line printer, etc.) involving devices unique to one input/output control module and devices assigned to different input/output control modules. The device-to-device transfers are completed without intermediate main processor interruption or intervention.

3. completion of device-to-"level 2" memory extension system transfers (bulk core to tape, disk to bulk core, etc.) in either direction between an input/output control module and a memory extension control module. These device-to-mass memory transfers are completed without intermediate main processor interruption or intervention.

4. interactive/real time unit-to-device operations by providing processing capability at the data service level. The translator can immediately unite time dependent operations (disk rotational position-selected disk transfer, data document sorter- pocket select) without intermediate main processor interruption or intervention.

The autonomy of the data service operations of the I/O control module provides the increased data throughout by eliminating intermediate main processor delay routes and also enhances the probability of a fully multiplexed data service mode of simultaneous operation of the input/output channels within the input/output control module.

In accordance with these objects there is provided a multiple channel input/output system including an improved control module coupled to each channel, input/output device peripheral controllers, and several multiple-path peripheral exchanges for coupling selected input/output devices to two or more of the device controllers.

The input/output control module of the invention includes a program translator unit capable of simplified construction of input/output descriptors responsive to program words or elements and a data service unit for executing the specified data transfers The program translator unit includes apparatus for selecting an available data path for each input/output transfer to be performed and apparatus for assembling descriptors or control words from segments of the input/output program elements.

The data service unit comprises five subsections designed specifically to efficiently handle the five principal device classes of data throughout: (1) batch, (2) high speed, (3) very high speed, (4) real time/interactive, and (5) data communications.

Each subsection is completely independent and operates asynchronously with the other subsections. The subsections are of modular design and are included in the input/output control module only when that device class is present in the system.

Also provided is apparatus for constructing memory control words for addressing a free-field bit addressable system memory of the type described in A.J. DeSantis et al., U. S. Pat. application Ser. No. 880,535, filed on Nov. 28, 1969, entitled "Information Processing System having Free Field Storage for Nested Processes," for example.

Other objects, features and advantages of the subject invention are presented in the following detailed description of the preferred embodiments and illustrated in the accompanying drawings, wherein.

Figures 7, 7A:
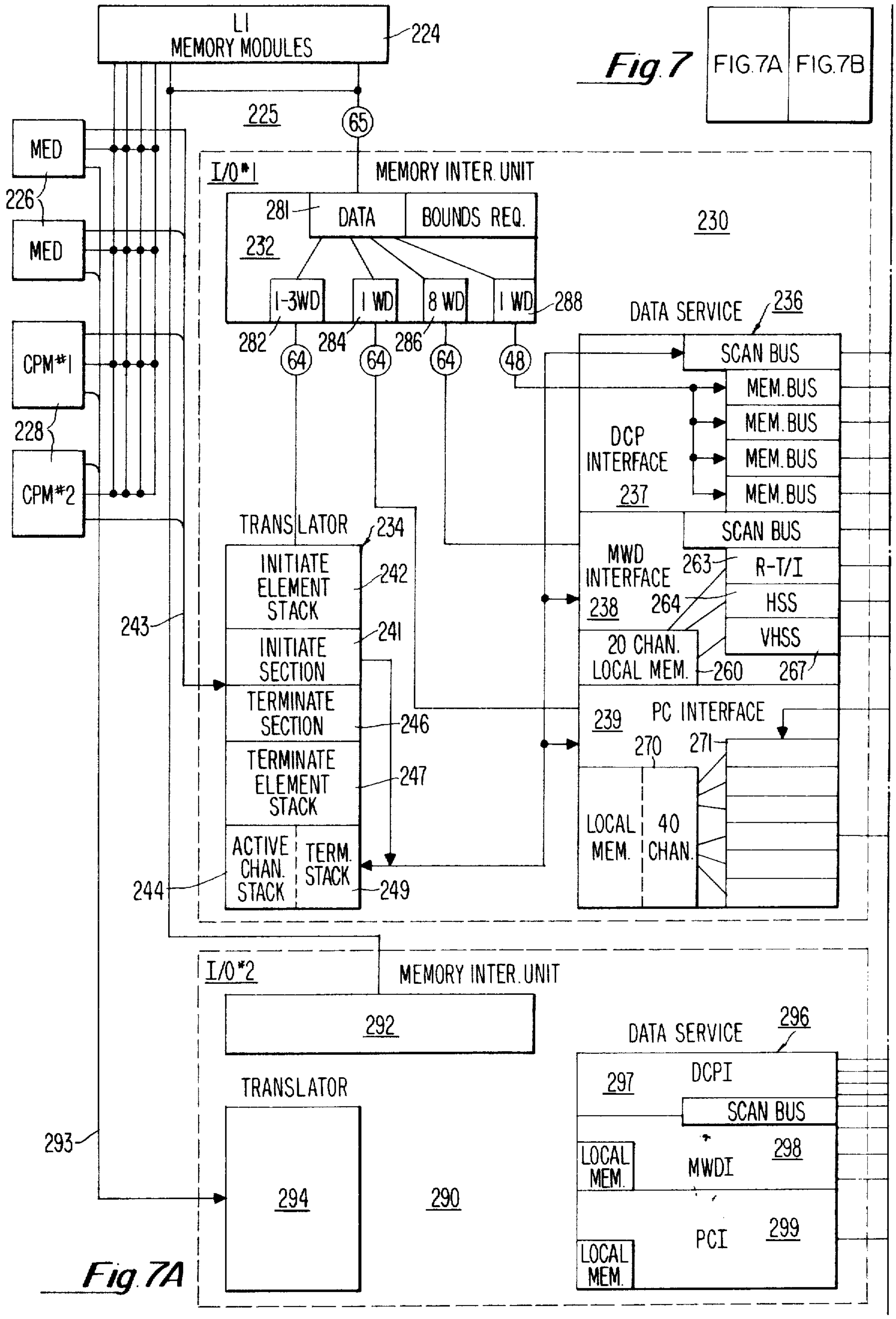
Figure 7B:
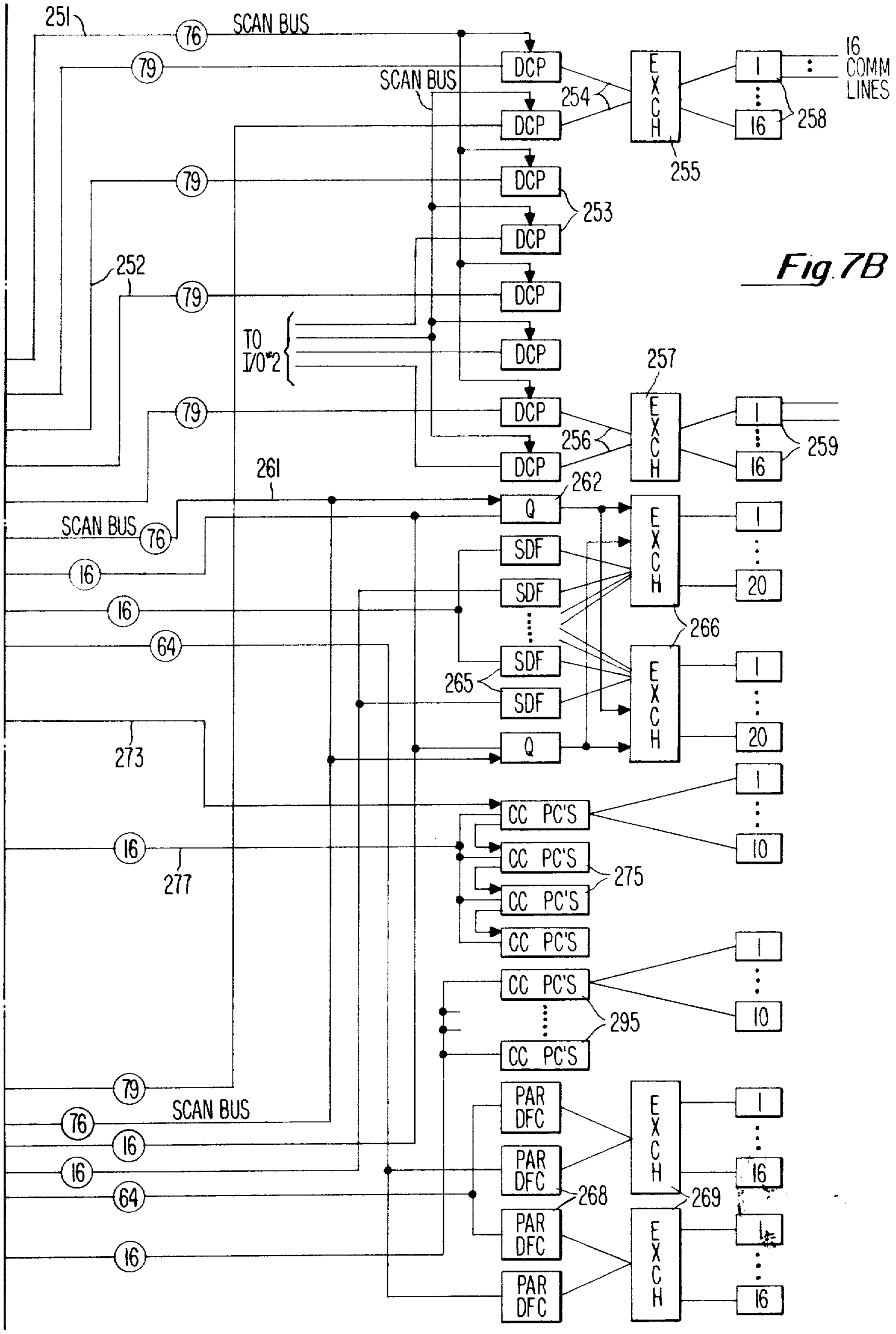
Figures 8, 9:
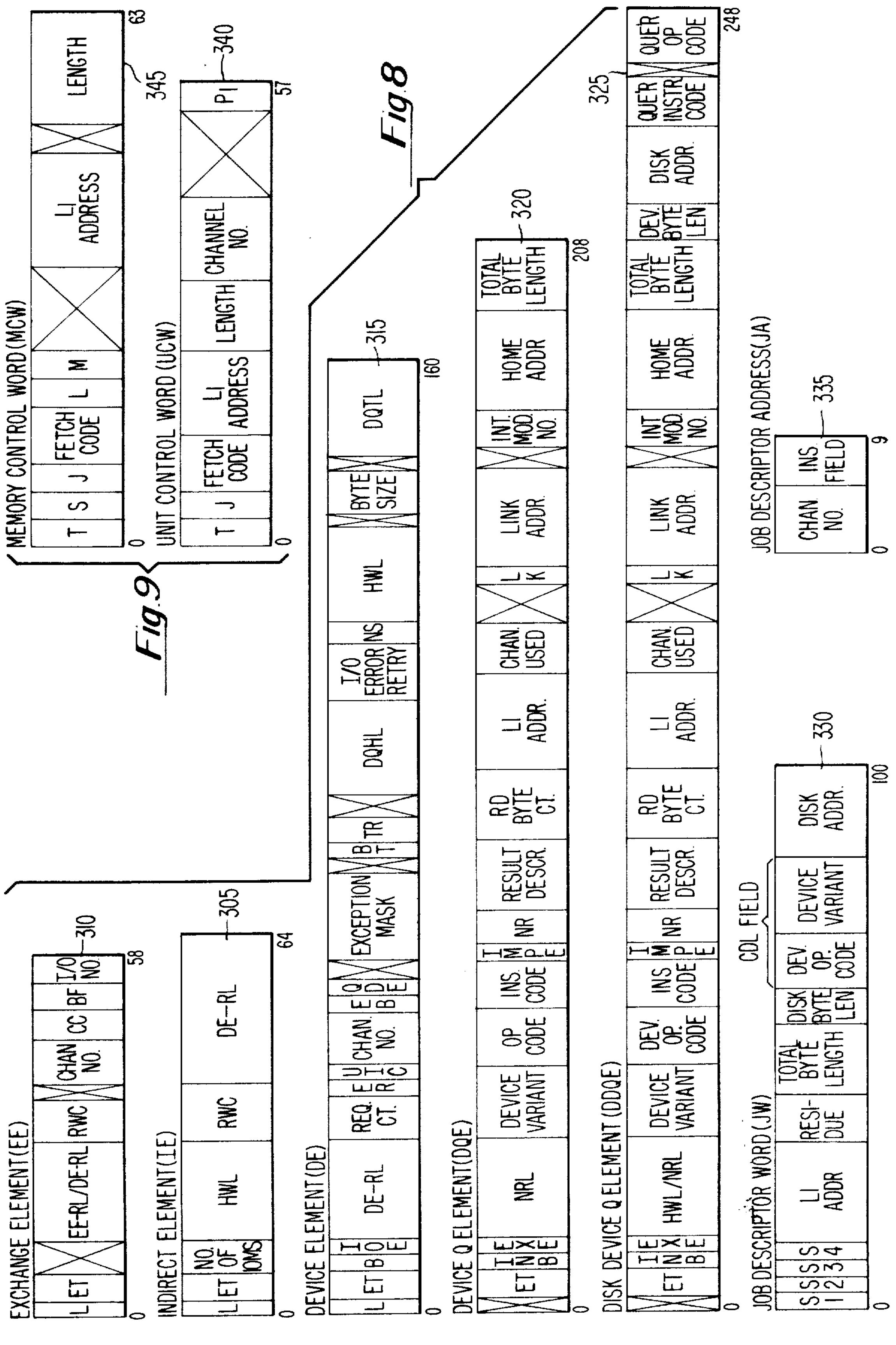
Figures 10, 10A:
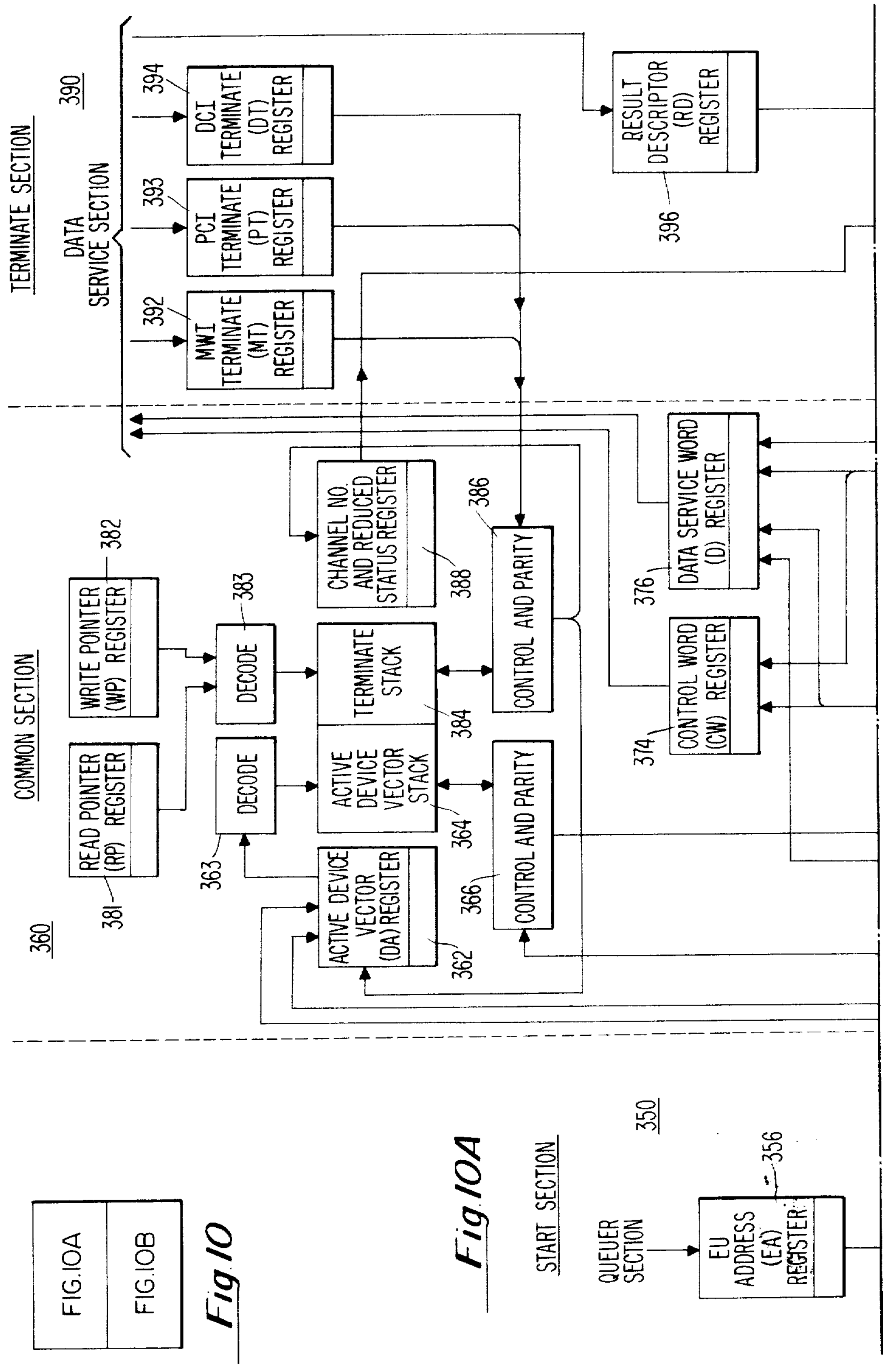
Figure 10B:
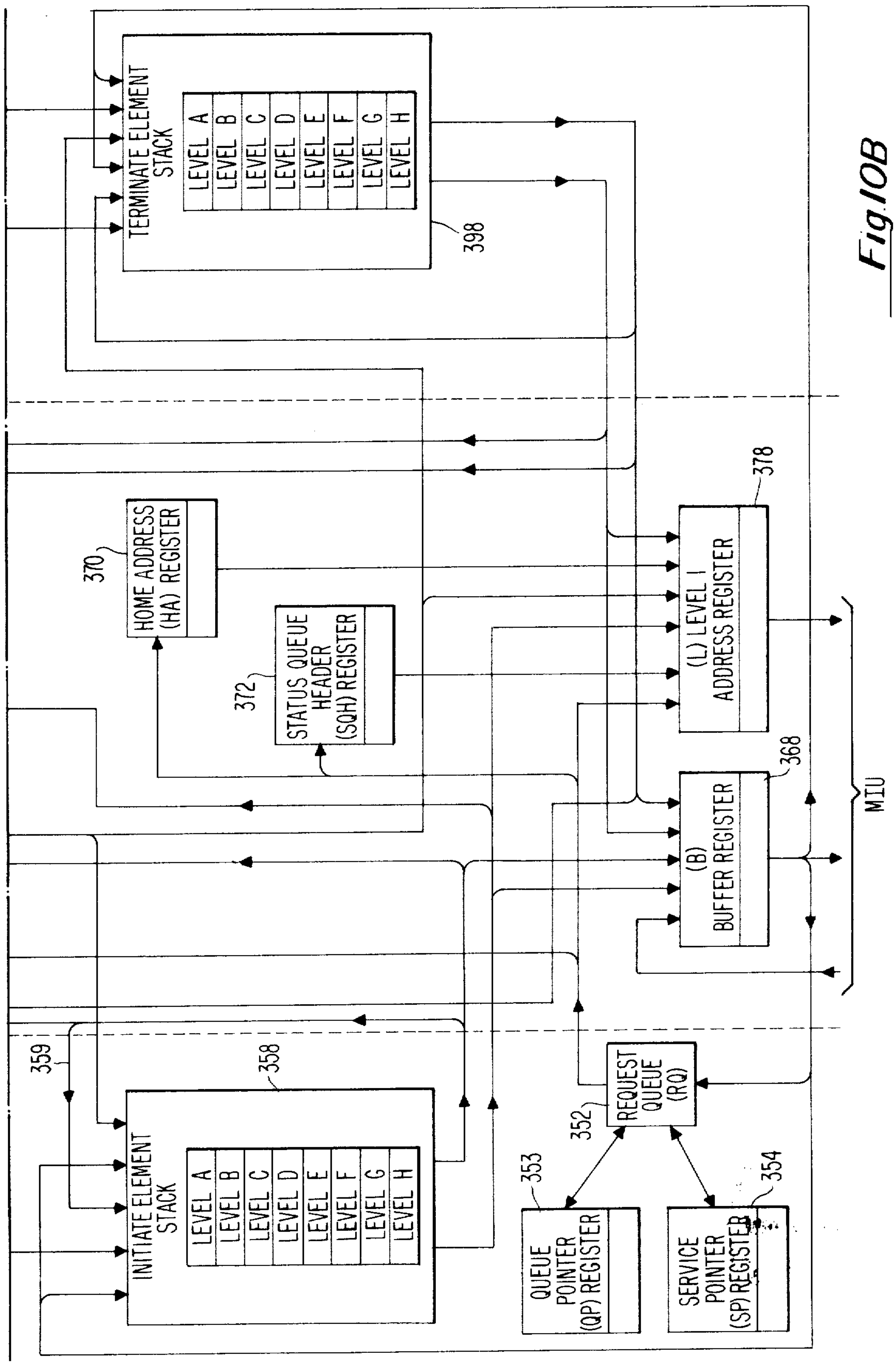
Figure 11:
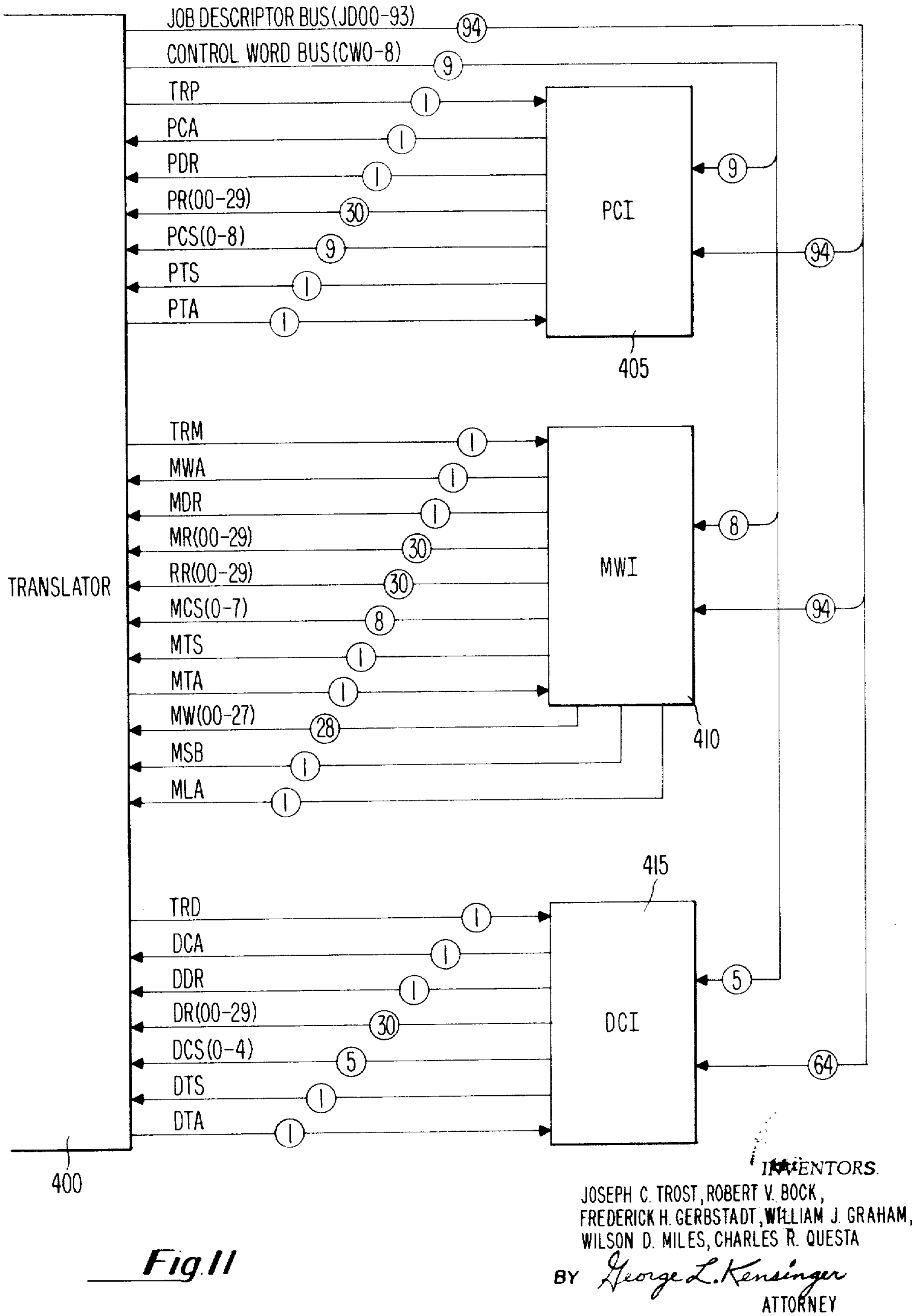
Figures 12, 12C:
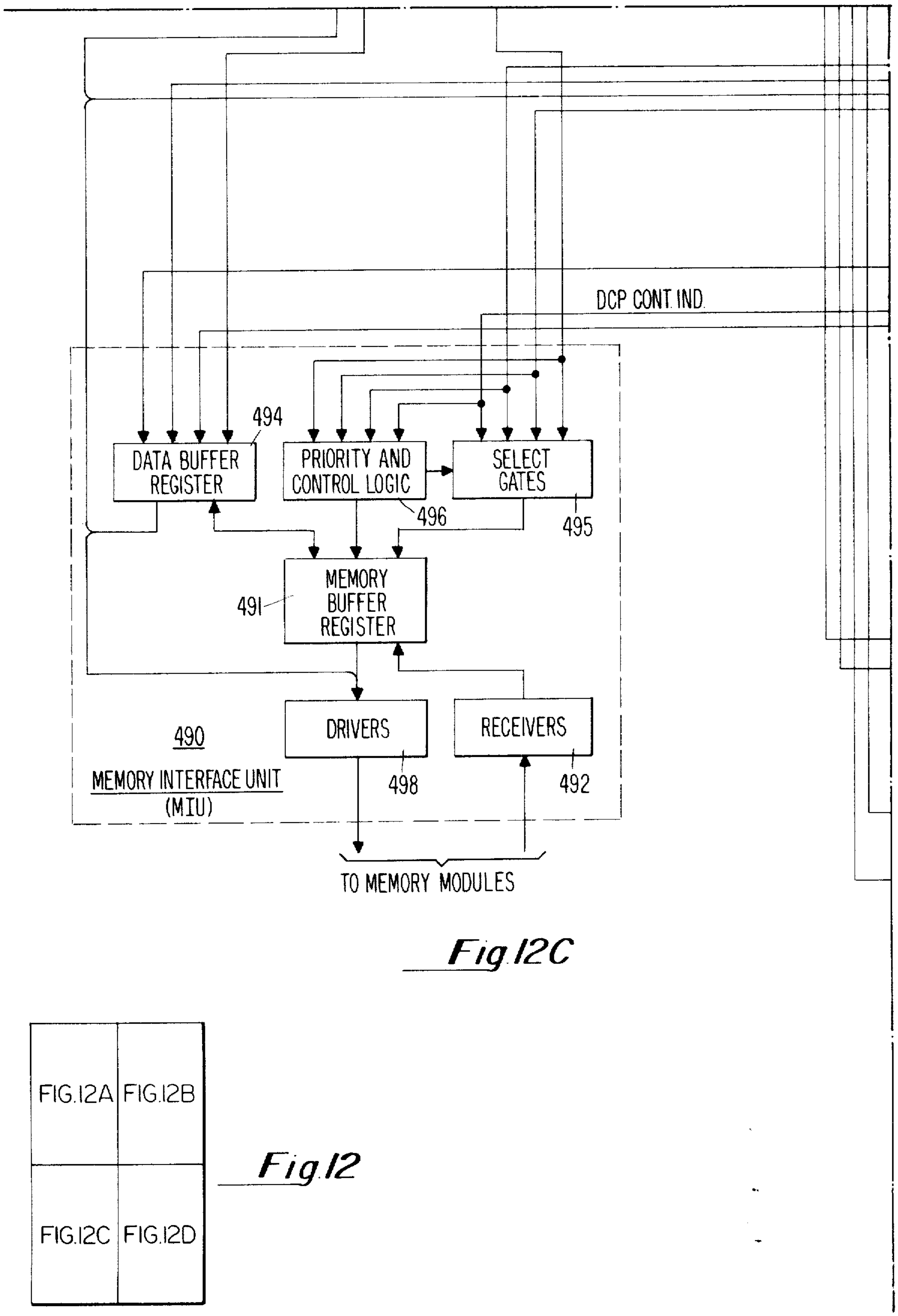
Figure 12A:
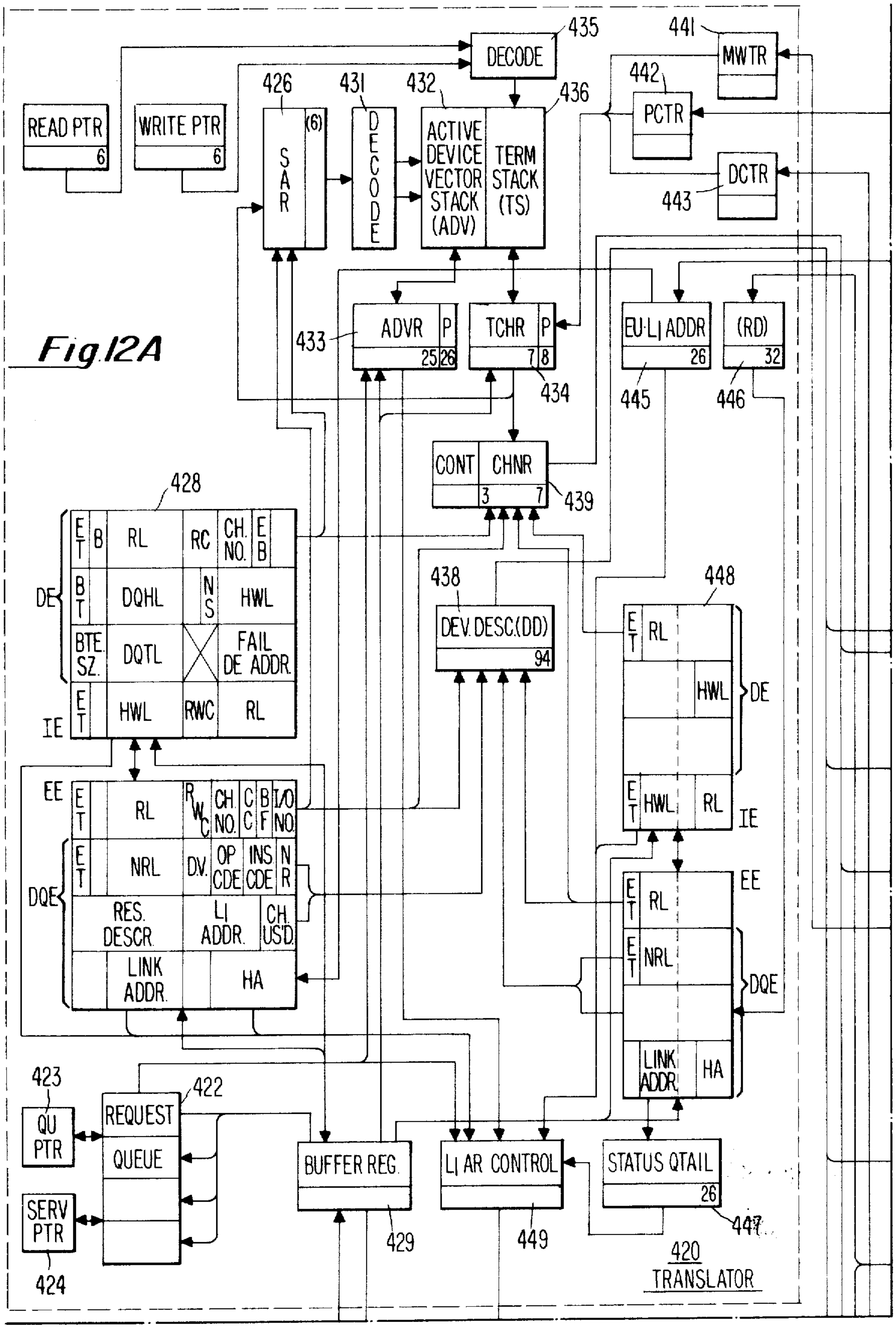
Figure 12B:
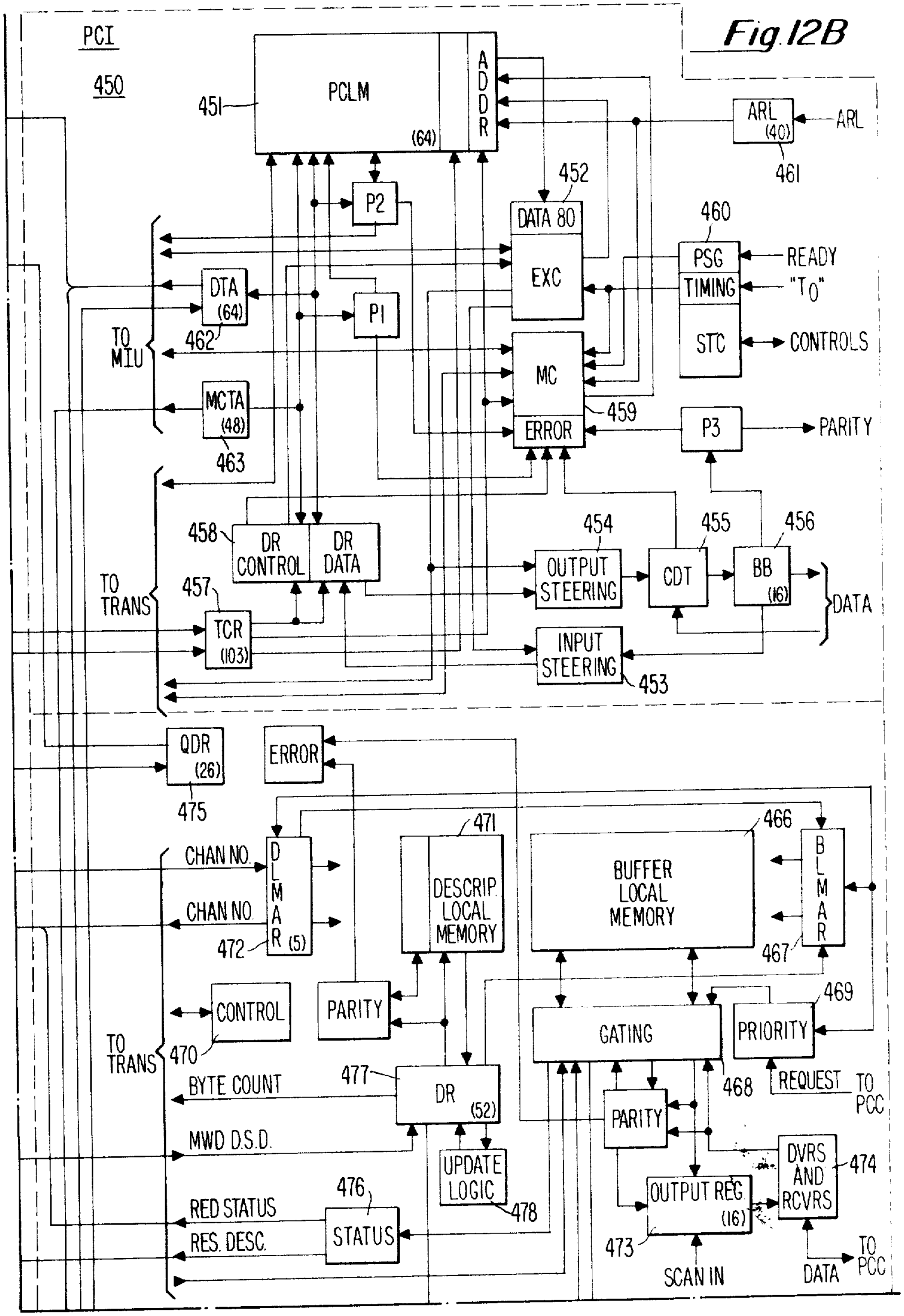
Figure 12D:
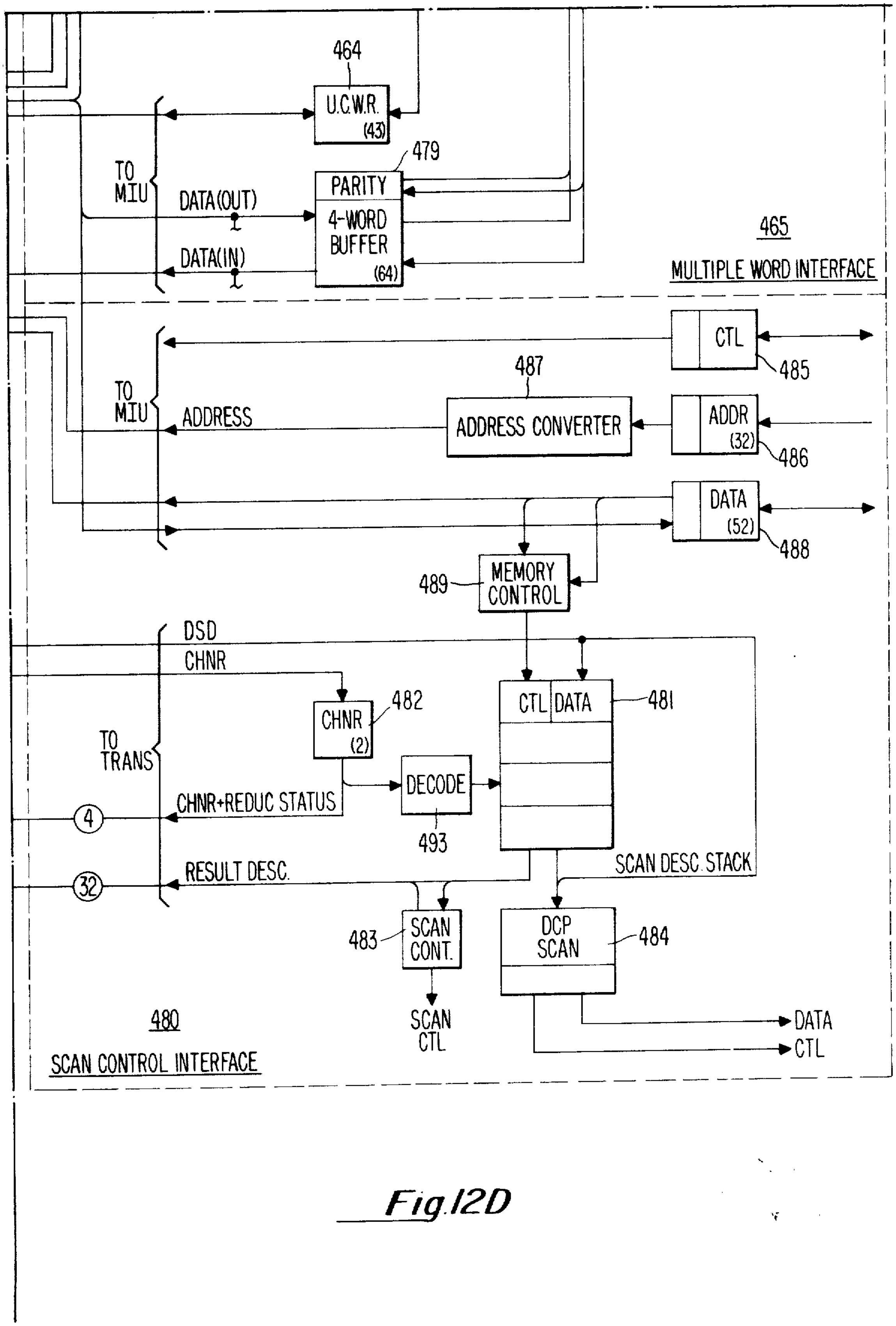
Figure 13:
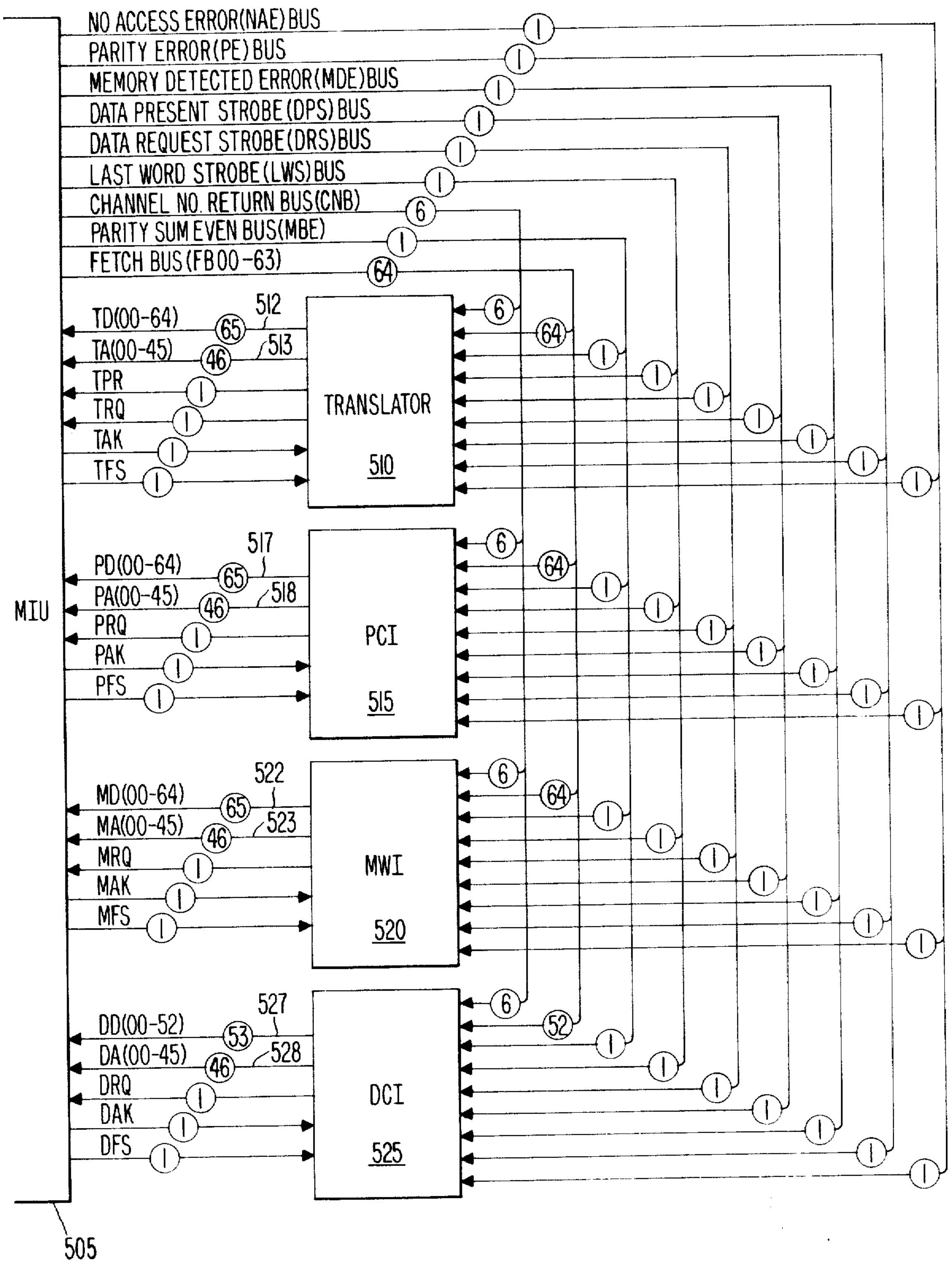
Figure 14:
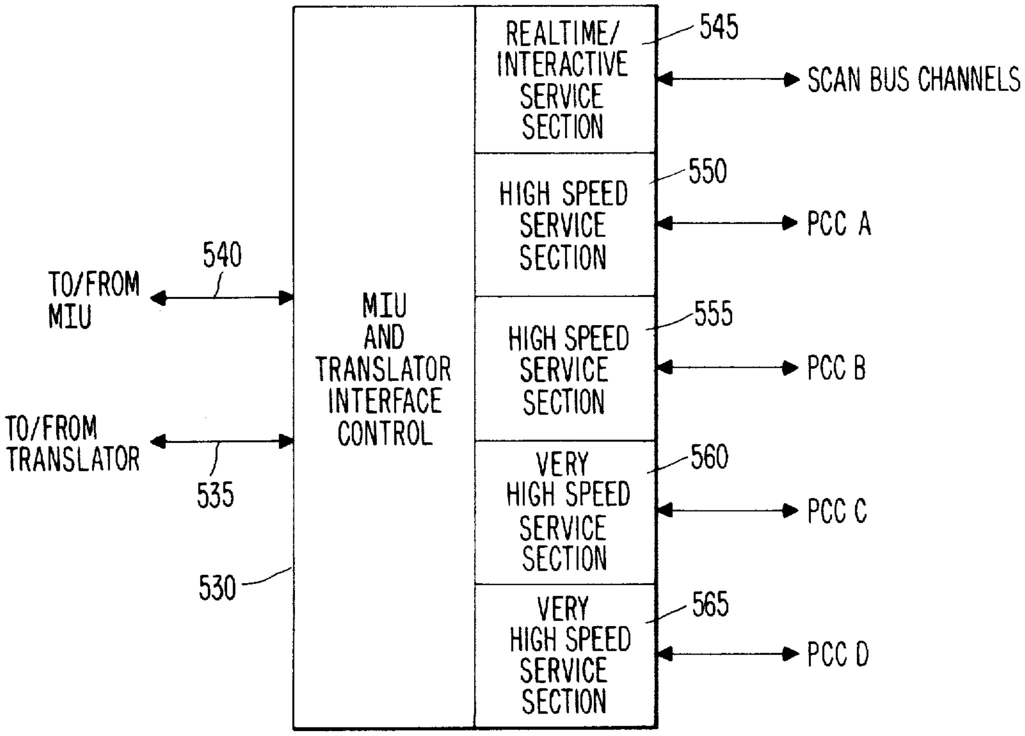
Figure 15:
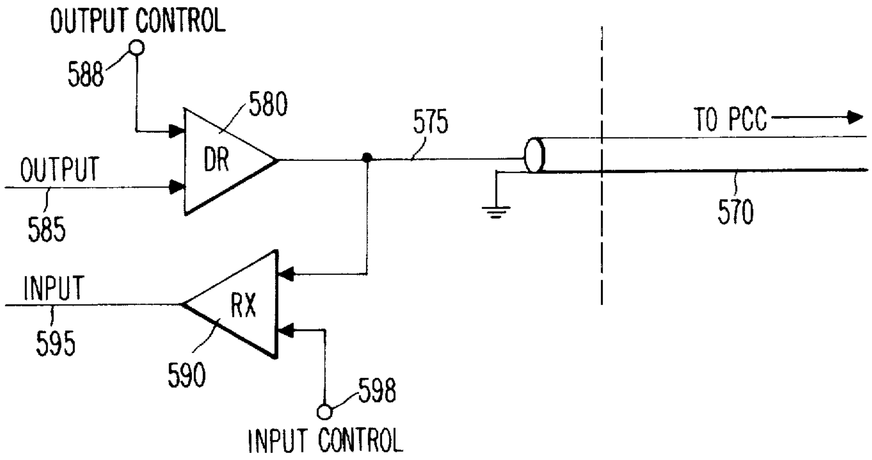
Figure 16:
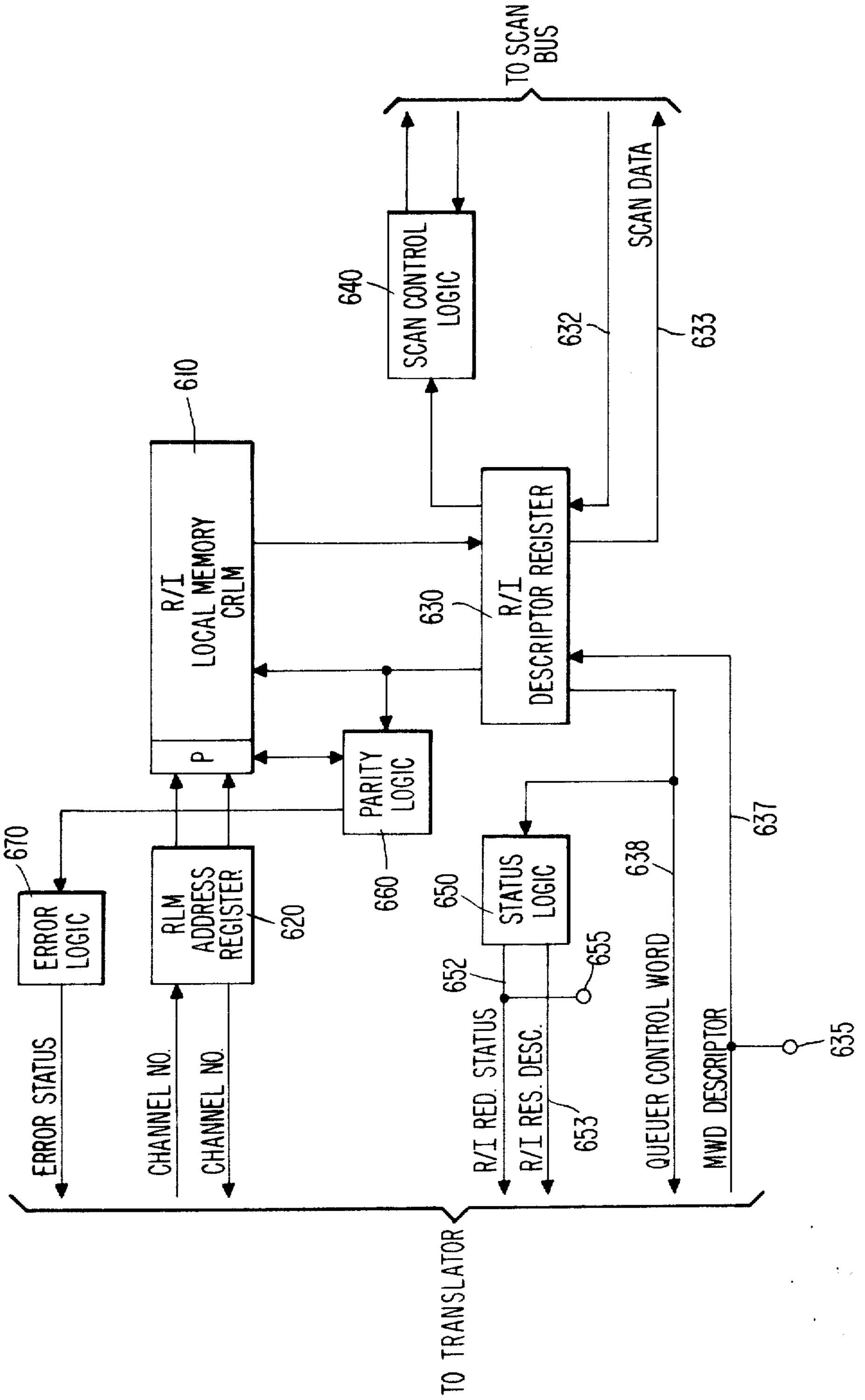
Figure 17:
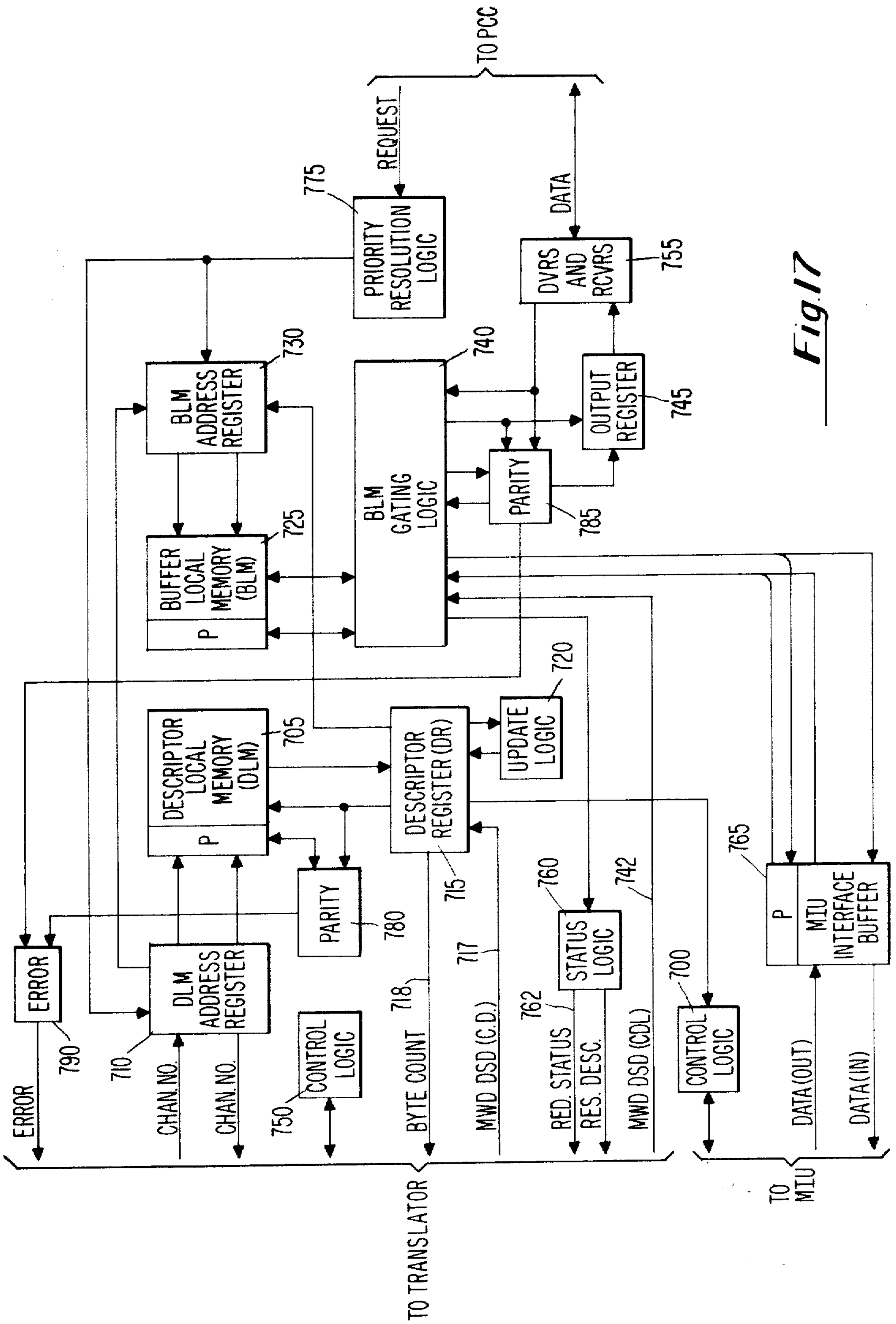
Figure 18:
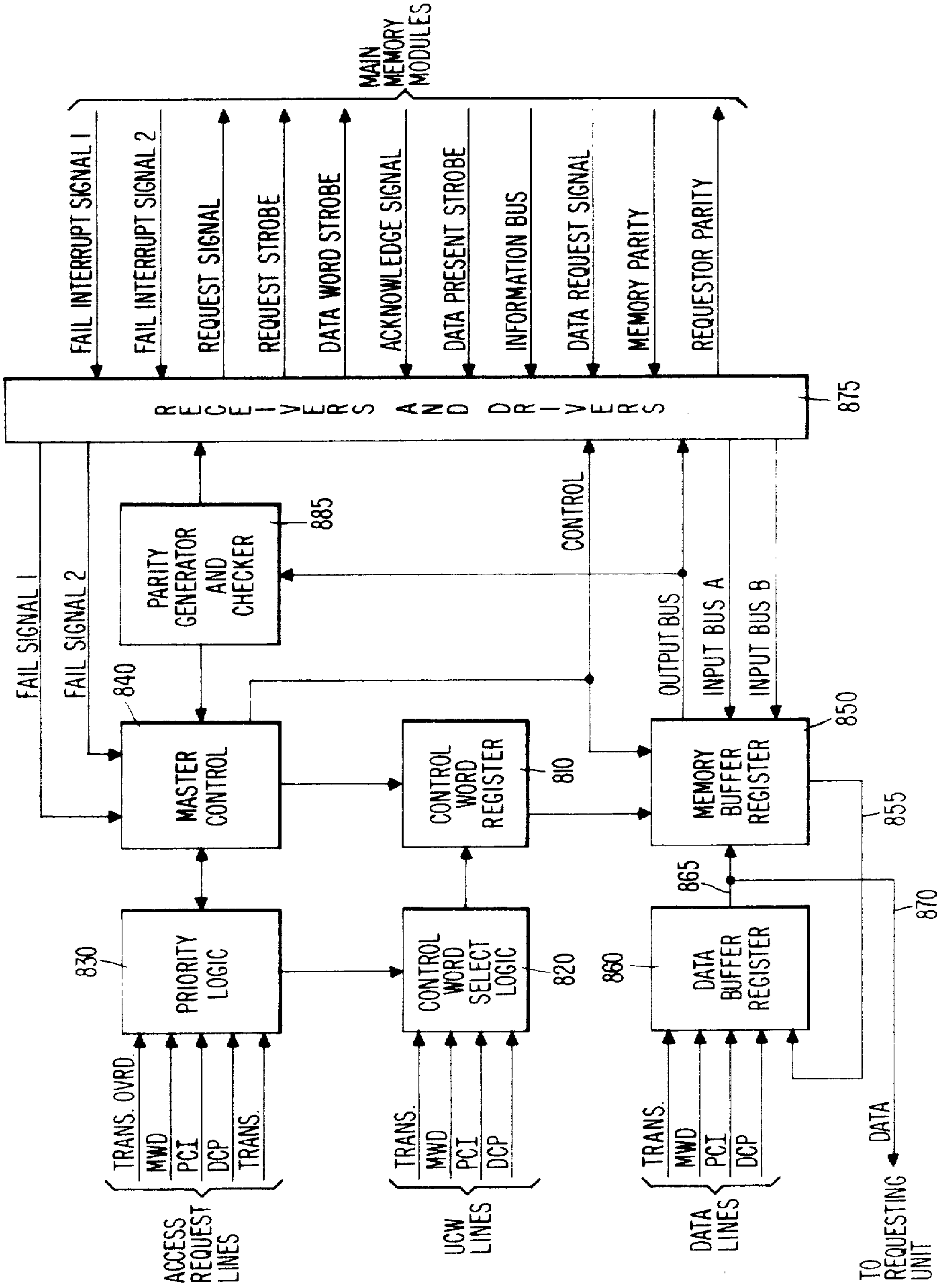

FIG. 7, consisting of FIGS. 7A and 7B, illustrates the subject input/output system as connected to an exemplary information processing system;

FIG. 8 depicts illustrative input/output control program element word formats;

FIG. 9 depicts illustrative memory access control words;

FIG. 10, consisting of FIGS. 10A and 10B, illustrates the translator unit component interface;

FIG. 11 shows the signal interface connections between the translator unit and the data service unit of the invention;

FIG. 12, consisting of FIGS. 12A, 12B, 12C, and 12D, is a schematic block diagram of the subject input/output system control module;

FIG. 13 illustrates the signal interface connections within the input/output control module of the invention;

FIG. 14 depicts a functional breakdown of the service sections of the multiple word interface unit;

FIG. 15 illustrates the connection of data signal drivers and receivers for the peripheral control channels;

FIG. 16 is a block diagram of the real-time/interactive service section component interface;

FIG. 17 is a schematic block diagram of the high speed service section component interface;

FIG. 18 is a block diagram of the memory interface unit; and

Figure 19:
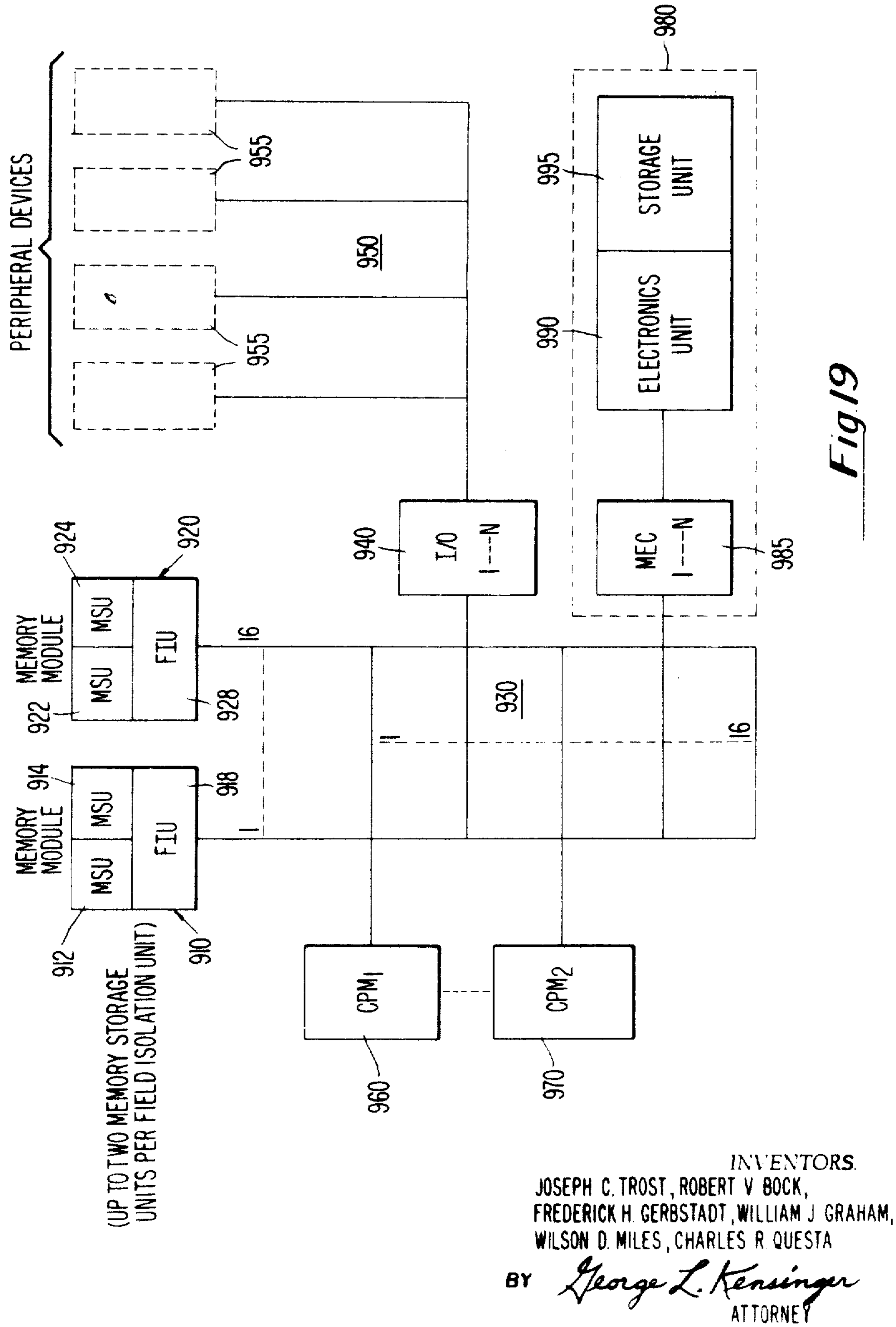

FIG. 19 is a generalized block diagram of an information processing system employing the subject input/output system.

DETAILED DESCRIPTION OF THE PREFERRED EMBODIMENTS

Figure 1:
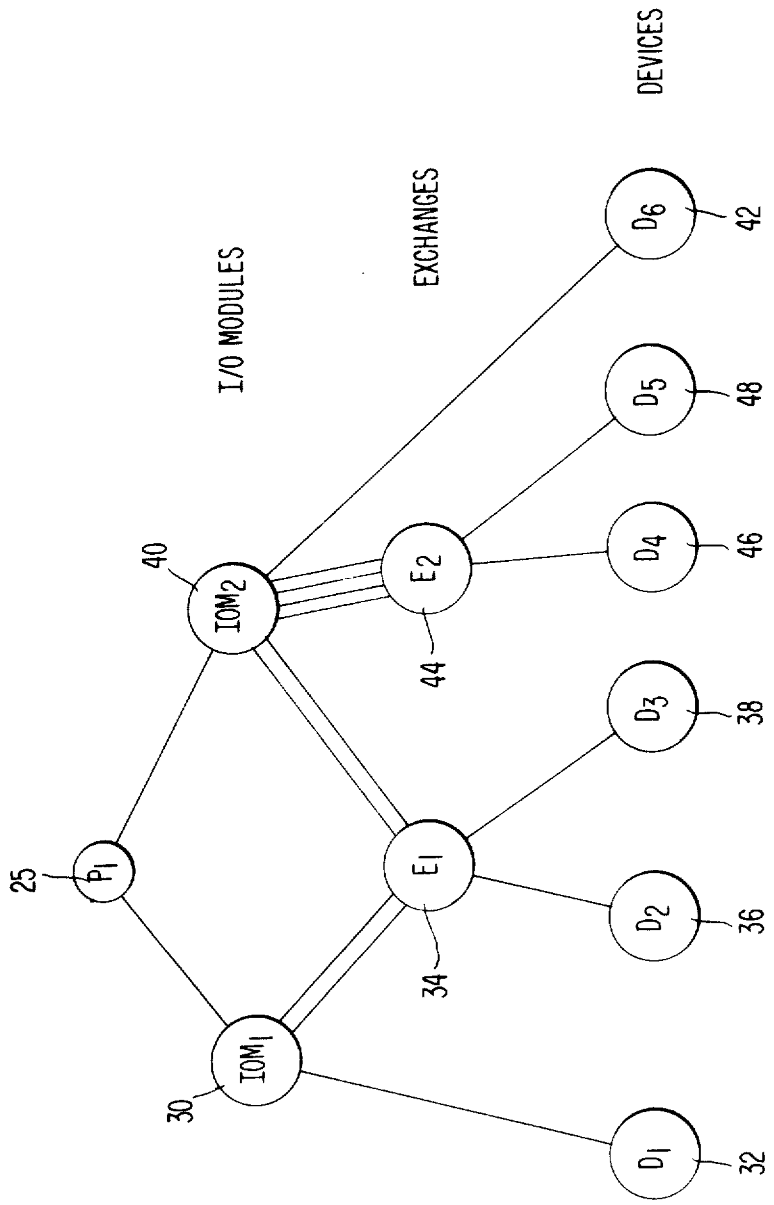
FIG. 1 depicts the general configuration of the subject input/output system.

The input/outout system of the subject invention is comprised of at least one input/output control module and a plurality of peripheral device controllers, exchanges, and input/output devices. The input/output subsystem may be interconnected in a multitude of different configurations, depending upon the user's requirements. The drawing of FIG. 1 illustrates at least one example of each possible type of connection that may be made between the input/output control modules and the other units of such a system.

As shown in the drawing, input/output modules 30 and 40 are connected to an information processing system 25 and to exchange 44, shared exchange 34, and directly to a peripheral devices 32,42, Peripheral input/output devices 36 and 38 are connected to shared exchange 34 and peripheral devices 46 and 48 are coupled to the other exchange 44. A shared exchange is an exchange which is coupled to, and serviced by, more than one input/output control module. The peripheral device controllers are not illustrated in this drawing because they do not affect the design concept of the subsystem and may be thought of as extensions of the input/output control modules.

Input/output system throughout can be maximized if the binding of a complete data path between the processing system 25 and a peripheral device is delayed until the device is ready to accept an input/output job. As an example, if peripheral device 36 is to be initiated, the data path required to connect the data processing system with the device involves a choice between two input/output control modules 30 and 40, and then a choice between two different channels within the selected input/output control module to the exchange 34.

If data paths to input/output devices are preselected prior to the initiate time for a process, a situation can develop in which the device is available but the preselected path to the device is not, thus delaying execution of the process. This situation is far less likely to occur if more than one data path between the process and the device can be selected at the process initiate time.

Figure 2:
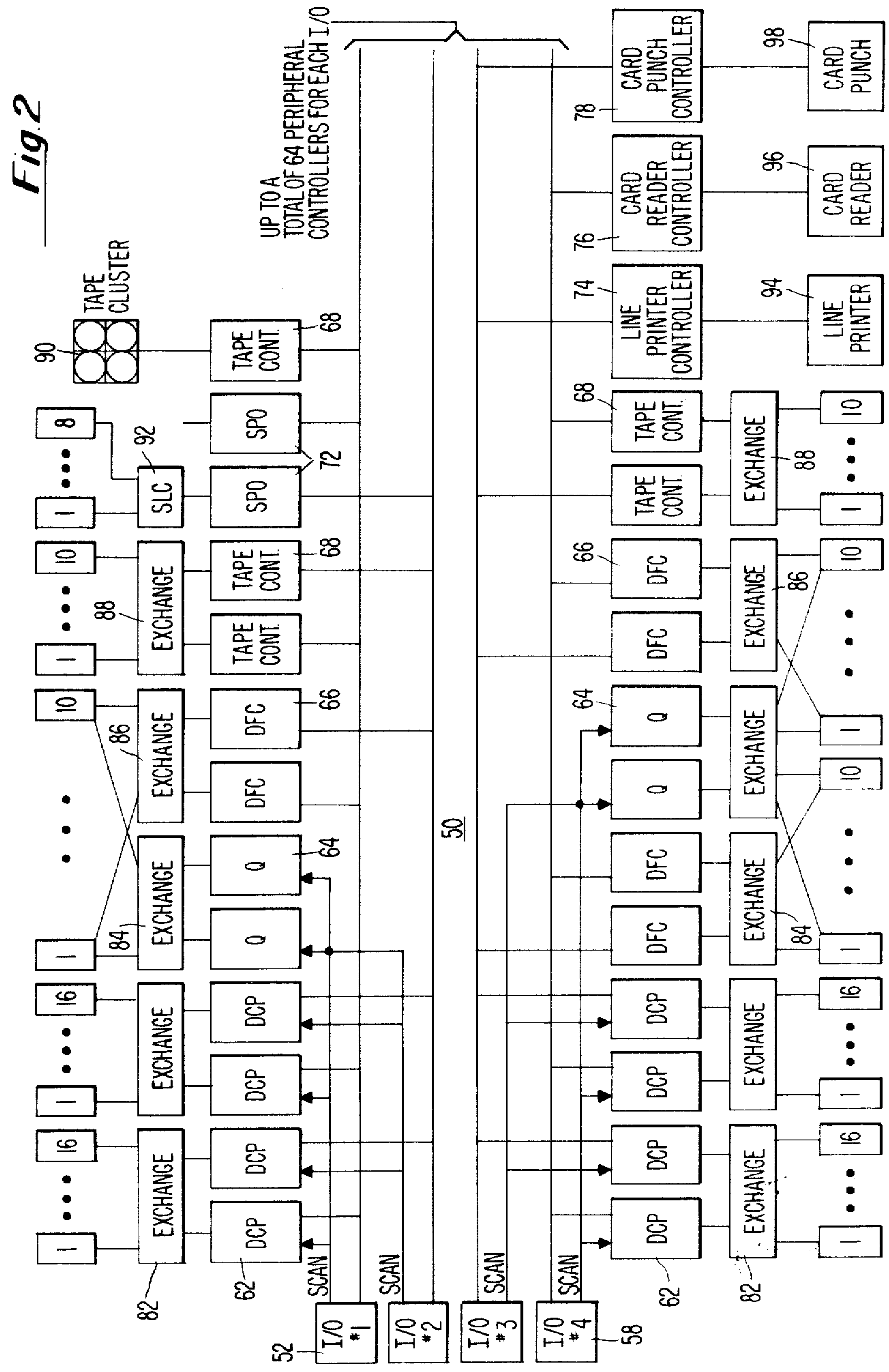
FIG. 2 illustrates a typical configuration of an input/output system of this type.

FIG. 2 illustrates a typical configuration of the input/output system of the present invention. An input/output exchange 50 is coupled to a plurality of input/output control modules 52 – 58, and to a plurality of peripheral device controllers 62 – 78. There may be up to 64 different peripheral controllers connected to each input/output control module, for example.

Data communication processors 62 are coupled through peripheral exchanges 82 to a plurality of data communication terminal devices, such as teletypewriter units or other key set units. Disk queuer control units 64 are coupled through exchanges 84 to a plurality of disk storage devices, as are disk file controllers 66 through peripheral exchanges 86. Tape control unit 68 are similarly coupled through peripheral exchanges 88 to a plurality of tape storage units or directly to a tape cluster storage unit 90.

Each supervisory printer output controller 72 may be coupled through a single line control unit 92 to a plurality of remotely controlled printer units or display units. Line printer controller 74, card reader controller 76 and card punch controller 78 are coupled to line printer 94, card reader 96 and card punch unit 98, respectively.

In order to enable the input/output control modules to select data paths to the input/output devices for servicing input/output requests, a software map of the I/O subsystem configuration is necessary. At system initialize time (cold start time) an I/O subsystem map is constructed and loaded into the system memory. This map specifies which devices can be serviced by each of the input/output control modules, and the alternate data paths available to each peripheral device for input/output transfer service. The I/O subsystem map also contains the I/O job service requests for the devices (the device queue elements) that specify the I/O services required.

Figure 3:
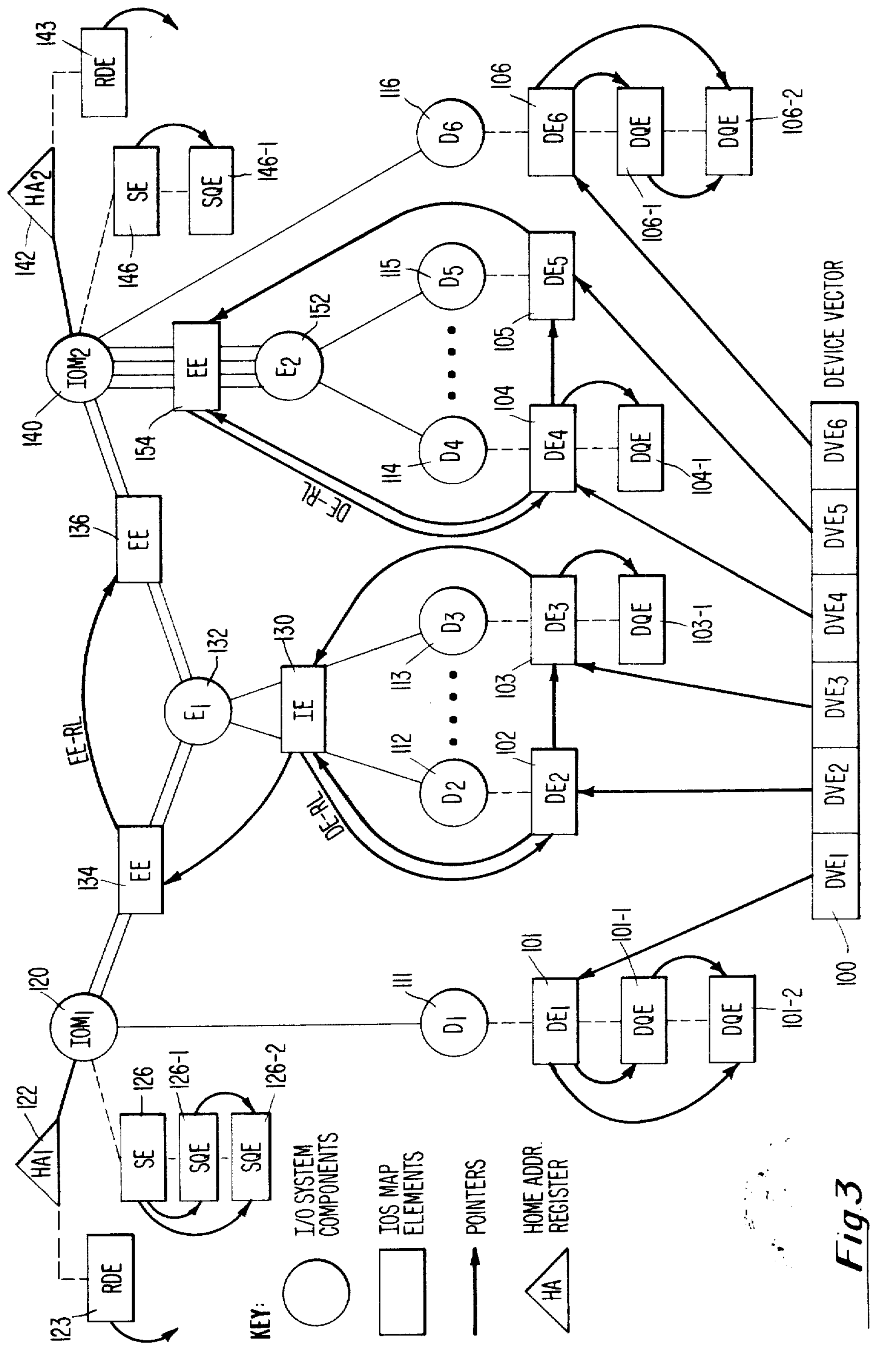
FIG. 3 illustrates a typical program map configuration for the subject I/O system.

A typical I/O system map configuration is illustrated in FIG. 3. Requests for input/output data transfers are entered into the applicable device queues of the I/O system map by a processor upon reference to device vector 100 which identifies the location of the associated device control elements and the I/O modules which can service the devices. The servicing of these input/output requests is then left to the I/O control modules which are coupled for servicing the respective input/output devices.

All requests for input/output data transfers are assigned to specific input/output devices. Each process requesting an input/output transfer specifies a device number an an index into device vector 100, which is referred to in order to place the request in the specified device queue. Once the request has been queued, the system processor is free from any further management or action in the input/output process.

The drawing of FIG. 3 illustrates the I/O system map required for the I/O subsystem represented in FIG. 1. As indicated, the I/O system map comprises the following program elements: device vector elements 100, device elements 101 – 106, device queue elements 1-1-1, 2 through 106-1, 2. Also included in the I/O system map are exchange elements 134, 136, 154, indirect element 130, status elements 126, 146 and status queue elements 126-1, 2 and 146-1.

Also included in the drawing of FIG. 3 is a representation of home address registers 122 and 142 of the input/output control modules 120 and 140, respectively. Each home address register can be loaded with the system memory address of a request descriptor element such as 123, 143 which can specify and initiate input/output service jobs for the input/output devices or signal relocation of the home address or device and status elements in the system memory.

Figure 4:
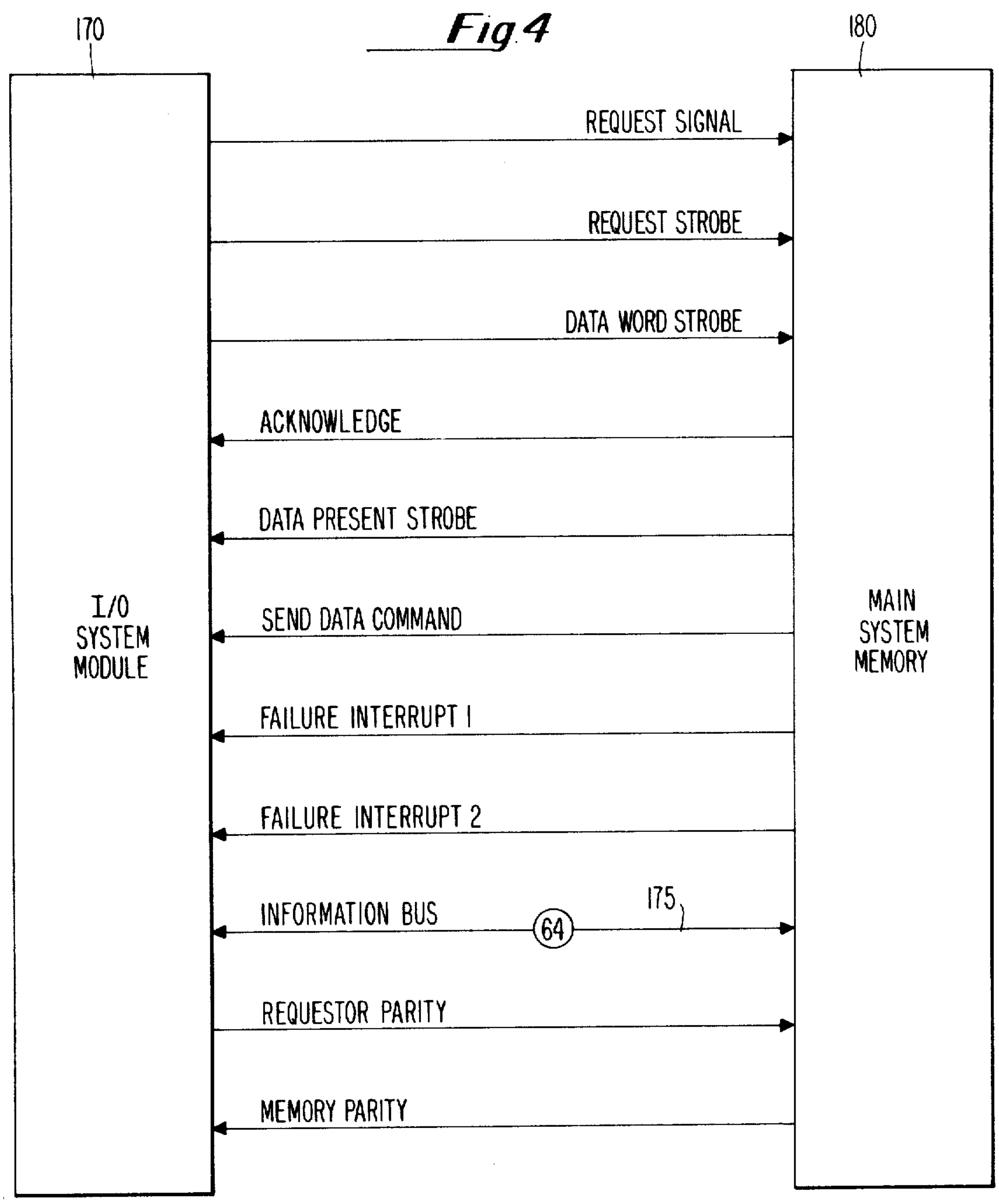
FIG. 4 shows a typical signal interface between the subject input/output system and a main system memory.

FIG. 4 illustrates the signal interface and information flow between input/output control module 170 and a representative system memory 180 to which it may be connected. A bidirectional 64-bit information bus 175 is connected between the I/O control module and the system memory for the transfer of data or control words. Request signals are sent by the input/output system to system memory 180 to select a specific portion of the memory for information exchange.

The request strobe and data word strobe signals are sent to the system memory to inform it that a control word or a data word is being transmitted to it over the information lines. The acknowledge signal is sent to the input/output system when I/O service is initiated. The data present strobe and the send data command signals are sent to the input/output system to inform it that a data word is present in the input register of the system memory that the field length of a store operation is greater than the parallel bit capacity of information bus 175. Also provided are failure interrupt lines 1 and 2 and requestor and memory parity signal lines.

Figure 5:
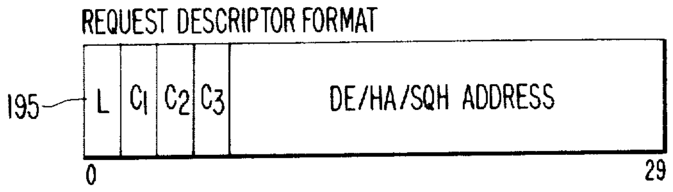
FIG. 5 depicts a request descriptor format for use in the system.

FIG. 5 depicts a representative format for request descriptors which the input/output system 170 of FIG. 4 may be directed to access from a main system memory. A request descriptor may identify a new system memory address for a device element (DE), a new input/output module home address (HA), a new status queue header address (SQH), or a system command, etc.

Figure 6:
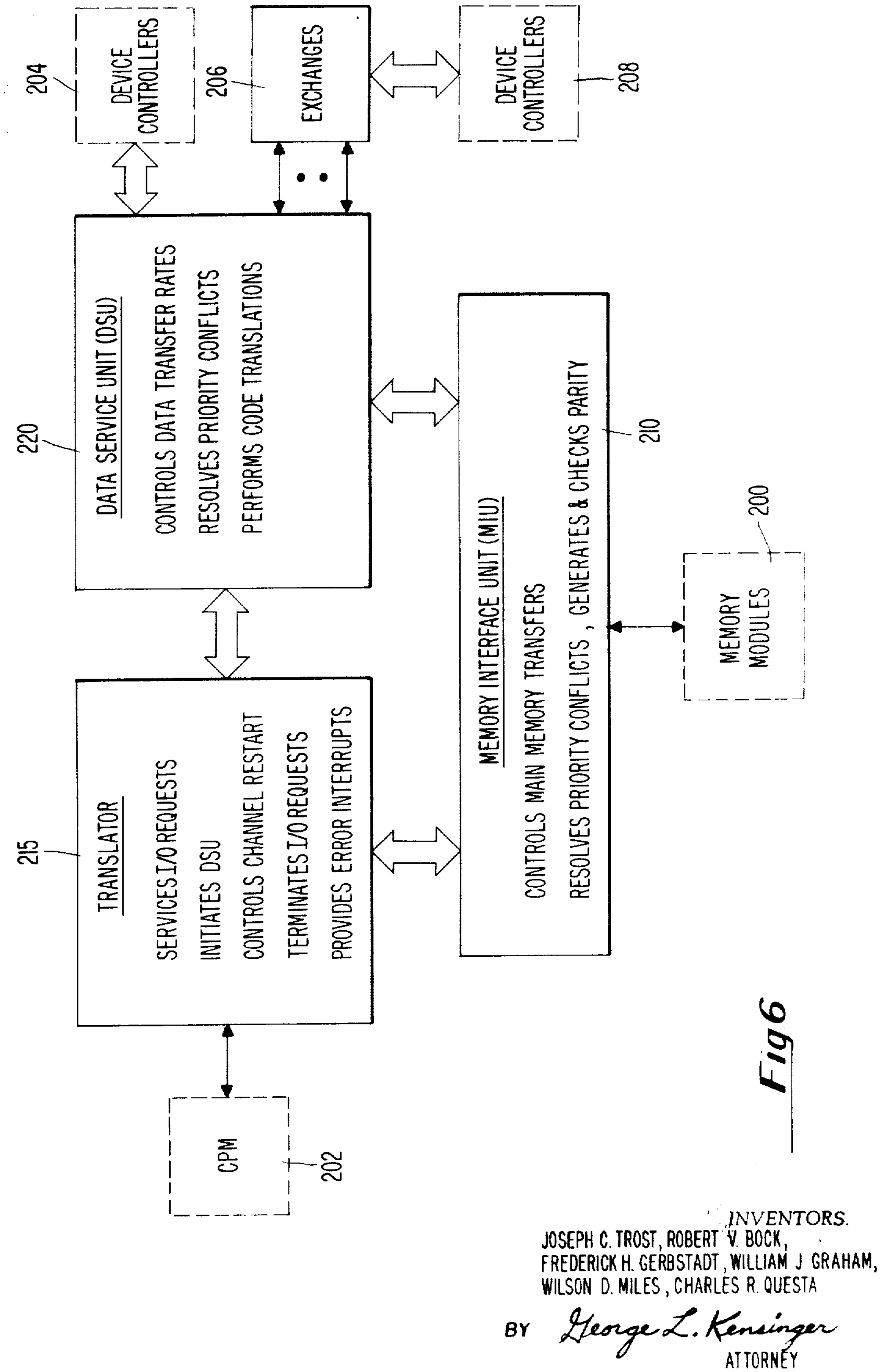
FIG. 6 depicts the input/output control module functional configuration.

FIG. 6 illustrates the input/output system functional configuration. The input/output system is comprised of a memory interface unit 210, a program translator unit 215 and a data service unit 220, together with exchanges 206 and peripheral device controllers 204 and 208. Data and control information transfers with main system memory 200 are controlled by memory interface unit 210 and interrupt conditions are provided between the system processor 202 and the program translator unit 215 of the input/output subsystem.

Translator unit 215 is a special purpose unit capable of performing specific program micro-sequences. It services system input/output requests by addressing the I/O system map stored in system memory 200 for determining which data paths are available for handling the desired service and for determining the system memory location of the program words or elements which specify the input/output services required. The translator responds primiarily to new request initiations, data service complete conditions, and main system or input/output subsystem error conditions. It also responds to storage disk queuer-initiated input/output operations as an explicit mode of operation.

The translator unit contains an initiate section for responding to new input/output requests (stored in system memory 200) and initiates operation of data service unit 220. The translator also contains a terminate section for terminating the operation of the data service unit and for returning result descriptors to the system memory. The translator terminate section reinitiates the data service unit when a terminating channel has another job assigned to it in the I/O system map.

FIG. 7, consisting of FIGS. 7A and 7B, illustrates the subject input/output system connected to a representative information processing system comprising memory modules 224, system interchange 225, memory extension units 226 and processor modules 228. Input/output control module 230 comprises memory interface unit 232, translator unit 234 and data service unit 236. Input/output control module 290 is comprised of memory interface unit 292, translator unit 294 and data service unit 296.

Memory interface unit 232 comprises memory address control unit 281, together with information transfer units 282, 284, 286 and 288, connected to translator unit 234 and the three data service interface units 237, 238 and 239, respectively. Information terminal units 282 – 288 are serviced in the following order: multiple word terminal 286 first, peripheral controller terminal 284 second, data communication processor terminal 288 third, and translator terminal 282 fourth. When necessary, translator unit terminal 282 may be granted a priority override and be serviced first.

Translator unit 234 is comprised of initiate section 241, initiate element stack 242, terminate section 246 and terminate element stack 247. The translator also comprises active channel stack 244 and terminate channel stack 249 which records the condition of the associated input/output channels as being either active or terminated. The translator is connected for receiving interrupt signals from memory extension controllers 226 and system processors 228 over bus 243.

Data communication processor interface 237 is comprised of scan control bus 251 and memory transfer busses 252, which are connected to half of the data communication processor units 253. The other data communication processors are coupled to data communication processor interface 297 of input/output control module 290, as shown.

Peripheral exchanges 255 and 257 each have two inputs and 16 outputs. Exchange 255 is connected to a pair of data communication processors 253 by conductors 254. Exchange 257 is connected to a different pair of data communication processors 253 by conductors 256. Exchanges 255 and 257 are each connected to 16 data communication terminal units 258 and 259, respectively, each of which may in turn be connected to 16 data communication lines.

Multiple word interface unit 238 is comprised of a local memory 260 having a storage location for each multiple word channel to be serviced and a scan control bus 261 which is connected to a pair of storage queue units 262. Also included in the multiple word interface are real-time/interactive unit 363 connected to each of the storage queue units, a high speed service section 264 connected to a pair of serial disk file control units 265 and a very high speed service section 267 connected to a pair of parallel disk file controller units 268. In the preferred embodiment there are up to four R-T/I channels, up to eight high speed channels which service serial disk files and high speed storage tape units, and up to eight very high speed channels for servicing parallel disk files, for example.

Peripheral controller interface 239 comprises a local memory 270 which includes a memory control unit and an execute control section 271 connected to communication center peripheral controllers 275 by conductors 273 and bus 277. Each communications center 275 includes a plurality of peripheral controllers, each of which may be connected to a peripheral input/output device such as a conventional magnetic tape unit, tape punch, tape reader, card punch or card reader. A predetermined priority of service between the different peripheral controllers of communications center 275 is established and synchronized with the peripheral controller interface 239 over conductors 273.

Four input, twenty output exchanges 266 are coupled between serial disk file controllers 265 and up to twenty serial disk files each. Peripheral exchanges 269 each have input lines connected to a pair of parallel disk file controllers 268 and sixteen output lines, each of which may be connected to a different disk file. A group of communication center peripheral controllers 295 are connected between peripheral controller interface 299 of input/output control module 290 and up to forty conventional peripheral input/output devices (not numbered).

The drawing of FIG. 8 depicts the representative program elements which may be employed in the map of FIG. 3. Indirect element 305 corresponds to indirect element 130, and exchange element 310 may correspond to either exchange element 134, 136 or 154. Device element 315 may correspond to one of the device elements 101–106 and device queue element 320 or disk device queue element 325 may correspond to any of device queue elements 101-1,2 through 106-1,2.

The process of starting a new request begins when a system processor places a request descriptor of the type illustrated in FIG. 5 into the home address location 123 or 143 of input/output control module 120 or 140, illustrated in FIG. 3. At the same time, the system processor sends a request interrupt signal to the selected input/output control module to signify the presence of the request. This interrupt signal causes the translator unit of that I/O module to fetch the new request and store it in its request queue. The request will identify the location of a new device element (DE) which the initiate section of the translator will fetch and then determine whether or not the request is directed to a device which is connected to an exchange.

For a non-exchange device, the translator unit refers to the device queue head link field (DQHL) of the device element which identifies the system memory location of either a device queue element 320 or a disk device queue element 325 which specifies the first input/output transfer job to be performed by the device. The device queue element is lock fetched by the translator, setting the L bit of the device element, the device element address is stored in the active device vector register of the translator, and a combine operation of the device element 315 and the device queue element is executed by the translator to construct a job descriptor word 330 and a job descriptor address 335. The job descriptor is then sent to the data service unit of the input/output module to initiate and control input/output transfers with the specified peripheral device.

If the exchange bit (EB) of the device element fetched by the input/output control module is set, identifying the associated input/output device as being connected to an exchange, the translator will refer to the head-ward link field (HWL) of the device element. This field will contain the system memory address of an exchange element 310, or the system memory address of an indirect element 305 which will contain in its head-ward link field the address of an exchange element 310. The translator will then compare the channel count field (CC) of the exchange element 310 with its busy field (BF) to determine if a path to the specified device is available. A path will exist if these two counts are unequal and the associated device queue element 320 or disk device queue element 325 identified by the DQHL field of the device element will be lock fetched. The device element address will be stored in the active device vector register of the translator which will then construct a job descriptor word and address to be sent to the associated data service unit for initiation of the input/output service job.

Referring again to the input/output system map configuration of FIG. 3, when input/output module 120 accesses device element 102, it will be referred by its HWL field to indirect element 130, which in turn will contain the address of exchange element 134 in its HWL field. If the channel count (CC) and busy field (BF) of exchange element 134 are equal, indicating that both paths from input/output module 120 to exchange 132 are busy, the number of service attempts field (NS) in the device element will be incremented and service of the device element by input/output module 120 will terminate. Device element 102 will then be available for access and service by input/output module 140. If device element 102 is accessed subsequently by input/output module 140 of FIG. 3, then its translator will be referred by the device element HWL field to indirect element 130. which in turn will refer its head-ward link field to exchange element 134. Upon checking the I/O NO. field of exchange element 134, input/output module 140 will refer to the exchange element ring link field (EE-RL) of that exchange element which will refer it to its own exchange element 136. If a data path between input/output module 140 to exchange 132 is available, then data transfer service will proceed and the job will be executed under the control of the device element 102.

If the data paths from input/output module 140 to exchange 132 are busy, which will be indicated by a busy condition detected in exchange element 136, input/output module 140 will increment the ring-walk count field (RWC of indirect element 130 and the request will be restarted by the translator terminate section of one of the input/output modules 120 or 140 when one of its data transfer channels to exchange 132 becomes available. This will be done after the completion of a data service on one of these data paths.

When one of the data transfer channels from either input/output module 120 or input/output module 140 to exchange 132 becomes available, the respective input/output module will access the indirect element 130 and respond to its head-ward link field HWL and the device element ring-link field DE-RL for accessing exchange element 136 and device element 102, respectively. Service of the device queue element data transfer job referred to by the DQHL field of the device element will then proceed.

FIG. 10, consisting of FIGS. 10A and 10B, illustrates the translator unit component interface of the present input/output control module. The translator comprises a start or initiate section 350, a common section 360 and a terminate section 390. All input to the translator unit from the system memory is made through buffer register 368. Similarly, all sections of the translator unit address the level I system memory through address register 378. Home address register 370 and status queue header address register 372 output directly to level I address register 378. These are referred to by the translator whenever the input/output module is signaled by an interrupt signal to access a request descriptor or it has a result descriptor to be transferred to a status queue in the system memory. The SQH address is the system memory address of the status element of the input/output system.

Start section 350 includes an initiate element stack 358 which is loaded principally from buffer register 368 and control register 366. Initiate element stack 358 contains predesignated locations for the storage of the device element, device queue or disk device queue element, and exchange element plus indirect element, if any, of one input/output device at a time. The stack also has an input from disk file electronics unit address register 356 for the insertion of a disk address into a disk device queue element for handling queuer-initiated input/output jobs.

The start section of the translator also includes a request queue 352 for storing a plurality of different request descriptors of the type illustrated in FIG. 5. By removing the service request descriptors from the system memory quickly, the home location of the I/O control module in the system memory identified by home address register 370 is kept open for the entry of new I/O service requests. A queue pointer register 353 and a service pointer register 354 are provided in association with the request queue to provide for first-in, first-out (FIFO) service of the request descriptors stored in the queue.

Translator common section 360 includes active device vector register 362, decoder 363, active device vector stack 364 and and control and parity unit 366. Active device vector stack 364 is a line-oriented addressable memory for storing the addresses of the input/output device elements presently being executed by the associated input/output module.

Active device vector stack 364 may be addressed by device vector register 362 through decoder 363 and loaded by control and parity unit 366. One input to active device vector register 362 is provided by initiate element stack 358 and an input to control and parity unit 366 is provided by request queue 352. These inputs may signal the initiation of input/output operations on any selected device, with the channel number for addressing the active device vector stack being provided by the initiate element stack. The device element system memory address itself, is provided by a request descriptor from request queue 352 for storage in the active device stack.

Other inputs to active device vector register 362 are provided by terminate control and parity unit 386 and terminate element stack 398. These units may jointly signal reinitiation or restart of input/output operations on a device. The channel number is provided by the terminate element stack of the terminate control and parity unit for addressing the active device vector stack. The device element address is provided by terminate stack 384 through control and parity unit 386 for storage in the active device stack.

The translator common section includes a control word register 374 for assembling job descriptor addresses and a data service word register 376 for constructing job descriptor words of the type illustrated in FIG. 8. The program input segments to be comined in these registers are provided from either initiate element stack 358 or terminate element stack 398 depending upon whether a new job is to be initiated or an input/output device or a device is being reinitiated or restarted. As may be seen from FIG. 8, job descriptor word 330 and job descriptor address 335 are constructed by assembling selected fields from device element 315 and device queue element 320 or disk device queue element 325, depending upon whether or or not the input/output job is for a disk device.

Translator terminate section 390 includes terminate register 392, 393 and 394 for the multiple word, peripheral controller and data communications interfaces, respectively, together with result descriptor register 396 and terminate element stack 398. The terminate registers provide inputs to terminate stack 384 of the translator common section through control and parity units 386. Terminate stack 384 is a memory for storing the device element addresses of input/output devices associated with terminate registers 393 and 394 in the order of first-in, first-out, subject to priority service of the device elements associated with terminating multiple word input/output devices indicated by terminate register 392. Read pointer register 381 and write pointer register 382 control the reading and writing in terminate stack 384 through decoder unit 383.

Also included in the translator unit common section is a channel number and reduced status register 388 for storing channel numbers and reduced status information received from control and parity unit 386 relating to terminated input/output devices. The translator terminate unit includes result descriptor register 396 for storing and delivering to terminate element stack 398 result descriptors relating to input/output transfer jobs completed by terminated devices. Terminate element stack 398 stores the device element 315, the device queue element 320 or disk device queue element 325 plus the exchange element 310 and indirect element 305, if any, of FIG. 8 for terminated devices. This information may be received by the terminate element stack from buffer register 368, or from control and parity unit 366, channel number and reduced status register 388 and result descriptor 396.

FIG. 11 illustrates the interface signal connections between a translator unit 400 and the peripheral controller interface unit 405, the multiple word interface unit 410 and the data communications interface unit 415 of a data service unit. A 94-bit job descriptor bus and a 9-bit control word bus for transmitting the associated job descriptor addresses are coupled between the translator unit 400 and each of the data transfer control units. A 30-bit peripheral result descriptor bus and a nine-bit peripheral controller status bus are connected from peripheral control interface 405 to the translator. Two 30-bit result descriptor busses and a 28-bit result descriptor bus are connected between the multiple word interface 410 and the translator unit, together with an eight-bit multiple word control status bus. A 30-bit data communications result descriptor bus, together with a five-bit data communications status bus, are connected between data communications interface unit 415 and the translator.

The remaining signal and control connections between the translator unit and the data transfer control units are illustrated in more detail in FIG. 12, consisting of FIGS. 12A – 12D, when fit together as illustrated. The representative input/output system control module of FIG. 12 is comprised of a translator unit 420, a peripheral control interface 450, a multiple word interface 465, a scan control interface 480, and a memory interface unit 490.

Translator 420 of FIG. 12 comprises units for performing the same functions as the translator unit of FIG. 10. It includes a two-section initiate element stack 428, a stack address register 426 for addressing active device vector stack 432, an active device vector register 433, terminate channel register 434, channel number and status register 439, terminate registers 441–443, queuer EU system address register 445, result descriptor register 446, and two-section terminate element stack 448. Unlike the translator unit of FIG. 10, translator 420 of FIG. 12 includes a status queue tail register 447. Upon the termination of an input/output operation, a result descriptor containing a reduced status field which identifies the reason and type of termination, a termination status field which explicitly identifies the cause of the termination, and a result byte count field which reflects the decremented byte count field of the corresponding job descriptor word stored in result descriptor register 446. This information is then entered into the device queue element location of terminate element stack 448, and then transferred to the system memory through buffer register 429 under the control of level 1 address register control 449 and status queue tail register 447, into which is inserted the link address field of the device queue element.

Certain major control fields of the I/O program words or elements are illustrated in initiate element stack 428 of the translator of FIG. 12. The device element DE includes an element type field ET identifying the element as a DE, a busy bit B indicating the status of the associated device, a DE ring link field RL for containing the address of the next device which is connected on the same exchange, request count field RC for maintaining a record of the number of request queued for the associated device, a channel number field CH. NO. for identifying an input/output channel assigned to service the associated device, an exchange bit EB for identifying the associated device as being connected to an exchange, a byte type bit BT for specifying the byte size for the associated device, device queue head-link field DQHL identifying the system memory location of the first I/O request in the device queue, number of service attempts bit NS for maintaining a record of the number of input/output modules that have attempted to start a job on the exchange associated with the device, a head-ward link field HWL for identifying the system memory address of the exchange element or indirect element associated with the device, a byte size field for specifying the amount of I/O data to be transmitted each transfer time, and a device queue tail link field DQTL for identifying the location of the last I/O request in the device queue.

The indirect element IE contains an element type field ET, a head-ward link field HWL, a ring walk count field RWC which maintains a record of the number of jobs queued for the exchange which must be started with a ring walk routine when an exchange channel becomes available, and a device element ring link field RL. The exchange element comprises an element type field ET, a ring link field RL containing the address of another exchange element if a shared exchange is involved to enable an exchange ring link routine to be exercized, or a ring link field RL containing the address of the device element of the first device connected with the associated exchange if it is not shared by different I/O modules to enable a device rink routine to be exercized, a ring walk count field RWC, channel number field CH. NO., channel count field CC for specifying the number of channels reserved to serve the associated exchange, a busy field BF, and an I/O No. field identifying the input/output module associated with the exchange element.

The device queue element DQE comprises an element type field ET, a next ring link field NRL identifying the system memory address of the next DQE queued for this device, a device varient field D.V. indicating operating parameters of the associated peripheral device, an operation code field OP. CDE. and an instruction code field INS. CDE. for defining the I/O operation required of the peripheral device and the input/output control module, respectively, a number of retries field NR for maintaining a record of the number of times the DQE was initiated before being successfully executed, a result descriptor field, a level 1 system memory address field, a channel used field CH. US'D. for identifying the channel used by the input/output control module to service the specified device, a link address field which points to the DQE of another device to be linked to the associated device element thus enabling the input/output control module to queue requests to other devices or subsystems, and a home address field HA which is used in conjunction with the link address field to initiate the queued requests of the devices of other input/output control modules.

This mechanism provides the capability for input/output control modules to complete device-to-device (tape to disk, card reader to line printer, etc.) transfers and device to level 2 mass memory (tape to bulk core, etc.) transfers without any intermediate main processor intervention. These two-stage transfers are performed in either direction between any two input/output control modules, within any one input/output control module, or between any input/output control module and any mass memory (level 2) extension control module.

Peripheral controller interface 450 includes a line oriented local memory 451 having addressable locations for the storage of input/output job descriptors for each of the channels connected to the interface, and an execute control unit 452 for controlling all communications with the peripheral device controllers, including input transfers through input steering unit 453 and output transfers through output steering unit 454, code translator 455 and byte buffer 456. A translator command register 457 is coupled to the transistor unit for buffering descriptor job word transfers between the translator and the peripheral control interface. A descriptor register 458 is coupled to the transistor command register and to the PC local memory 451 for buffering data and control information transfers between the peripheral control interface and the translator and memory interface units. It is also used to hold the channel descriptor for execution and alteration of the operation in progress.

Mode control unit 459 establishes operational priorities within the peripheral controller interface, generates control codes and signals for the peripheral devices, controls interrogate and status vector operations, and controls all communications with the memory interface unit and the transfer of result descriptors to the translator unit. Service timing control unit 460 synchronizes the peripheral device operations and those of the peripheral controller interface and checks the device ready lines during interrogate peripheral status operations specified by the translator unit via translator command register 457. Access request priority logic 461 determines the relative priority of service requests ARL from the associated peripheral controllers and grants the next available memory cycle to the highest priority request received. Data transfer apparatus 462 is a temporary storage register for buffering data transfers between the PC local memory 451 or descriptor register 458 and the memory interface unit 490 and for transferring result descriptors to the translator unit 420. Memory control transfer apparatus 463 is a temporary storage register used in the transfer of system memory address control information generated by execute control unit 452 to the memory interface unit. Execute control unit 452 includes a length count generator when the input/output module is used with a free field system memory for specifying the length of the field to be addressed. Peripheral control interface 450 also includes parity generators/check units P1, P2 and P3 connected as shown for various data and control word transfers.

Multiple word interface 465 includes a data buffer local memory 466 and a descriptor local memory 471 having a job descriptor storage location for each of the associated multiple word input/output channels. A buffer local memory address register 467 and a descriptor local memory address register 472 are provided for addressing the respective memories. Gating unit 468 controls all data transfers with the buffer local memory and priority logic unit 469 controls the order of transfers of input data and of output data to peripheral devices through output register 473 and drivers and receivers 474. A status register 476 is provided for temporarily storing reduced status information and result descriptors received from gating unit 468 for the various multiple word input/output devices.

A descriptor register 477 is provided for transferring I/O job control descriptors between the translator unit 420 and descriptor local memory 471. It is used for addressing the buffer local memory 466 through address register 467 and the memory interface unit 490 through unit control word register 464. The descriptor register holds the device descriptor of the input/output job being executed and update logic unit 478 is provided for altering the device descriptor as portions of the input/output job are executed. A control unit 470 is provided for controlling the timing and sequence of multiple word data and descriptor or control word transfers.

A queuer descriptor register 475 is provided for storing the address of disk device queuer descriptors received from device descriptor register 438 of the translator unit. Queuer descriptors are held in register 475 to control input/output operations initiated by the disk queuer.

The multiple word interface also includes a four-word buffer register 479 coupled for transferring data between local memory gating unit 468 and the memory interface unit 490. The system memory locations for these input/output transfers are specified by unit control word register 463. Also included are parity generators/checkers and an error detection unit (unnumbered) used for validating data transfers in the multiple word interface.

Scan control interface 480 includes a scan descriptor stack 481 for temporarily storing data service descriptors DSD received from the translator unit 420 and control data such as status information received from data buffer register 488 through memory control unit 489. There is a storage location in scan descriptor stack 481 for each of the data communication processor (DCP) channels serviced by the scan control interface, which may be addressed by channel number register 482 through a decoder 493 under the control of the translator unit. This causes control information to be read out of the scan descriptor stack into scan control unit 483 and control information and data to be transferred to DCP scan register 484 for the output of data to a data communication device selected by scan control unit 483 and ready for data transfer.

Data may be transferred to or from data communication processor channels through data transfer register 488, with memory control signals being transmitted by control unit 485 and system memory address information for incoming data being transferred by address register 486 to memory interface unit 490 through address converter 487. The scan control interface controls scan output operations to each data communication processor (DCP) connected to the system. These operations are performed by a scan bus which is controlled by signals from scan control unit 483.

Memory interface unit 490 includes a memory buffer register 491 coupled to receivers 492 and to drivers 498 for connection to the memory or memory modules of an information processing system. A data buffer register 494 is coupled to the memory buffer register 491, the translator 420, and the interface units 450, 465, and 480 of the data service apparatus for the transfer of program elements and input/output data with the system.

Select gates 495 are coupled to the translator and to each of the data service units for receiving unit control words from them when they are requesting access to a system memory through memory buffer register 491. These unit control word requests are responded to in the order of multiple word interface 465 first, PC interface 450, scan control interface 480 next, and the translator last, as determined by priority and control logic unit 496. The priority and control logic unit also responds to priority override requests from the translator unit and controls the translation of unit control words into memory control words of the type depicted in FIG. 9 for effecting accesses to the associated system memory.

FIG. 13 illustrates the signal interface connections provided between the memory interface unit and the translator and data service units of input/output control modules of the type illustrated in FIG. 12. Memory interface unit 505 of FIG. 13 is connected for transmitting program control elements to translator unit 510 and output data and control information to peripheral control interface 515, multiple word interface 520 and data communication interface 525 via a 64 bit fetch bus. The memory interface unit is also connected to the translator unit and each of the data transfer control units by a six bit channel no. return bus CNB for identifying particular input/output channels to be interrogated or operated for the transfer of information. Several other control signal conductors are also connected between the memory interface unit and the other units as indicated in the Figure.

Translator unit 510, peripheral control interface 515 and multiple word interface 620 have 65 bit busses 512, 517 and 522, respectively, and data communication interface 525 has a 53 bit bus 527 coupled to memory interface unit 505 for transferring result descriptors and input data to it. Likewise, the translator unit and data service control units 515, 520 and 525 have 46 bit memory address busses 513, 518, 523 and 528 connected to the memory interface unit MIU for transferring system memory address control information to it relating to the transfer of data or result descriptors. Additional signal conductors are coupled between the translator and data transfer control units 510, 515, 520, 525 and the memory interface unit as shown. These are illustrated also in the schematic block diagram of FIG. 12.

FIG. 14 illustrates the functional breakdown of service sections in a multiple word interface such as interface units 238, 465 and 520 of FIGS. 7, 12 and 13, respectively. MIU and translator interface control unit 530 is coupled to the translator unit in the input/output system by bus 535 and to the memory interface unit in the system by bus 540.

Read-time/interactive service section 545 may be connected to a number of scan bus channels for servicing real-time clocks or elapsed time indicators, document sorters-pocket selector subsystems, and I/O devices such as disk file queuer units. High speed service sections 550 and 555 may be connected to a number of different serial disk file channels or high speed magnetic tape units, for example. Very high speed service sections 560 and 565 may be coupled to several parallel disk file controllers which transmit bits in parallel, or to other input/output devices of comparable data transfer speed.

FIG. 15 is a schematic illustration of data signal drivers and receivers utilized in data service control units 450, 465 and 480 of FIG. 12 and in multiple word data service sections 550–565 of FIG. 14. A shielded transmission line 570 is connected at one end to a peripheral control center terminal and at the other end to input/output conductor 575. This conductor is connected to the output of driver 580 and to an input of receiver 590 in the data service units.

The inputs to driver 580 are connected to data output conductors 585 and output control terminal 588 of the associated data interface unit. The second input to receiver 590 is provided by an input control conductor 598 and the output of the receiver is connected to a data input terminal of the associated interface unit.

FIG. 16 provides a schematic block diagram of a real-time/interactive (R/I) service section for a multiple word interface unit, corresponding to service section 263 of FIG. 7 and service section 545 of FIG. 14. The real-time/interactive service section includes a line oriented local memory 610 together with an associated address register 620 which receives channel number identification from an I/O translator unit when control descriptors are received for storage. The address register returns channel number information to the translator as input/output service jobs are completed. A descriptor register 630 is coupled between the translator unit and the R/I local memory for transferring control descriptors and result descriptors between them and for temporarily storing the control descriptors to be altered during the control of input/output channel operations.

A scan control logic unit 640 is coupled to respond to multiple word channel descriptors received by descriptor register 630 to control the scanning of associated real-time or queuer device channels in a predetermined order of priority. Input and output conductors 632 and 633 are connected to descriptor register 630 for the transfer of scan data which is temporarily stored in that register. A status logic unit 650 is coupled to the descriptor register for transmitting reduced status descriptors and result descriptors via conductors 652 and 653 to the translator unit. Control conductors 637 and 638 are connected to the descriptor register for conducting multiple word descriptors to it and for conducting queuer control words from the register to the translator unit. These paths provide the associated real-time/interactive capability by coupling devices or special processors on the scan bus interface to any device connected to the multiple word interface. Parity logic unit 660 is coupled to the local memory 610 and to the descriptor register 630 for generating and checking parity for the transfer of descriptors and control information in the real-time/interactive service section. Error logic unit 670 is coupled to the parity logic unit for providing error status information signals to the translator unit.

Each disk queuer unit controlled by the real-time/interactive section of FIG. 16 is also coupled to the very high speed service section illustrated in FIG. 17 for the transfer of input/output data in parallel through drivers and receivers 755. Multiple word descriptors (MWD) for queuer-controlled devices applied to bus 637 of the R/I service section of FIG. 16 are also applied to bus 717 through terminal 635 for entry into register 715 of FIG. 17. The channel designate level bit (CDL) of the multiple word descriptors is also applied to input 742 of gating logic 740 for indicating the presence of an operation code and device variant field for the associated devices.

FIG. 17 is a schematic block diagram of the component interface of high speed and very high speed multiple word service sections 264 and 267 of FIG. 7 and service sections 550–565 of FIG. 14. Very high speed input/outout service differs from high speed service primarily in the channel service phase of operation. The very high speed service section requires that eight-word system memory transfers be made during each input-output service cycle and the high speed service sections perform four-word transfers during the same period, for example.

The multiple word data service apparatus of FIG. 17 includes a line-oriented descriptor local memory 705 for storing the data transfer control descriptors of each of the channels to be serviced by it and an associated DLM memory address register 710. The memory address register receives channel number identification from the translator unit during the storage of descriptors or data and returns channel number identification to the translator unit during the transfer of result descriptors or input data to the system. A descriptor register 715 is provided for temporarily storing the input/output channel descriptor being executed and to enable the system memory address field, byte count field and the channel designate level field CDL comprising a device operation code and a device variant field to be updated by the associated update logic 720 to which it is coupled. The updated byte count of descriptors held in register 715 is transferrable over bus 718 directly to the translator unit.

Line-oriented buffer local memory 725 is provided for buffering all input and output data transfers with the associated peripheral device controllers through buffer local memory gating logic 740. Output data register 745 transfers output data from gating logic 740 to drivers and receivers 755. Input data is applied through the drivers and the receivers directly to the BLM gating logic as shown. The buffer local memory 725 and output register 745, together with MIU interface buffer 765 are all expanded in the very high speed embodiment.

The initiation of input/output channel operations commences upon the receipt of an access request signal from a device by priority resolution logic 775 which controls and resolves the priority of service granted to the input/output peripheral controllers being serviced by this section. The priority resolution logic is coupled to both descriptor address register 710 and buffer memory address register 730 for bringing a descriptor out of the descriptor local memory 705 and a data buffer word out of buffer local memory 725 for effecting the requested I/O transfers. Interface buffer 765 buffers data transfers between the memory interface unit (MIU) and the buffer local memory 725 through BLM gating logic 740.

Control logic unit 700 coupled to descriptor register 715 controls the transfer of data between the memory interface unit and the high speed service section. Control logic unit 750 controls the transfer of input/output device descriptors and control information with the translator unit of the system. Status logic 760 is coupled to buffer local memory gating logic 740 for transmitting reduced status and result descriptors to the translator unit. Parity generator and check units 780 and 785 check the parity of information transfers with the descriptor local memory and the buffer local memory gating logic, respectively, and provide error signals to error indicator unit 790 for alerting the translator unit.

FIG. 18 illustrates a memory interface unit for the subject input/output system to control all transfers with the main memory of an information processing system. A control word register 810 receives system memory address information specified by unit control words received from control word select logic 820 and develops system memory control words to transmit through memory buffer register 850 subject to master control 840. All data transfers with the functional units of the input/output system are handled as field-oriented operations and memory access requests from them are granted on a preassigned priority basis under control of priority logic 830 and the master control unit. The access priority accorded the functional units is the following:

1. translator priority-override requests 2. multiple word interface unit requests
3. peripheral controller interface unit requests
4. data communication processor interface requests
5. all other translator unit requests Memory buffer register 850 buffers all input/output data transfers to and from the system memory via data buffer register 860 and busses 855, 865 and 870, and the input and output busses connected to receivers and drivers 875. The receivers and drivers transfer all data and control information to and from the system memory and master control 840, memory buffer register 850 and parity generator and checker unit 885. The data transfer and control terminals of receivers and drivers 855 are all labelled in the drawing.

FIG. 19 provides a generalized block diagram of an illustrative multi-processor computer system incorporating the subject input/output control system 940 coupled to peripheral devices 955 through input/output exchange 950. A central exchange 930 couples I/O control system 940, central processor modules 960 and 970 and memory extension system 980 to the main system memory modules 910 and 920.

System memory module 910 incorporates a pair of memory storage units 912 and 914 coupled to and addressed by field isolation unit 918. Memory module 920 incorporates a pair of memory storage units 922 and 924 such as magnetic core memory units and a field isolation unit 928. Field isolation units 918 and 928 receive memory control words from the memory interface unit of FIG. 18 for addressing the associated memory storage units. The field isolation units may be of the type described in the above-identified A. J. DeSantis et al., patent application Ser. No. 880,535, for effecting free-field bit addressing of the memory storage units.

Memory extension system 980 is provided as an auxiliary or level 2 system memory for economically storing data which the main system memory modules cannot accommodate or which is not used frequently in the data processing operations. The memory extension system incorporates a controller 985 coupled to a data storage unit 995 by electronics unit 990. Storage unit 995 may be a bulk magnetic core memory of slower speed and lower cost than the main memory storage units 912, 914, etc. or may be a magnetic disk file storage unit, for example.

The information processing system illustrated in FIG. 19 may incorporate any number of input/output systems, central processor modules, and memory extension systems up to a combined total of 16 such subsystems connected to central exchange 930. A pair of input/output systems 940 connected in parallel as illustrated in FIG. 7 provides a reliable system in which either input/output control module can handle the I/O data transfers if the other becomes disabled. Two such input/output control modules also can divide the input/output transfer jobs between them since the binding of data paths is delayed until initiate time.

A number of abbreviated designations have been used to simplify some of the figures of the drawing. Some of these abbreviations and the unabbreviated designations are summarized below:

| Abbreviation | Unabbreviated Designation |
|---|---|
| B | Busy Bit |
| BF | Busy field |
| BLM | Buffer local memory |
| BT | Byte type bit |
| CC | Channel count field |
| CDL | Channel designate level bit |
| CH.NO. | Channel number |
| CH.US'D. | Channel used |
| DCP | Data communication processor |
| DCPI | Data communication processor interface |
| DE | Device element |
| DE-RL | Device element ring link field |
| DQE | Device queue element |
| DQHL | Device queue head link field |
| DQTL | Device queue tail link field |
| DSU | Data service unit |
| D.V. | Device varient |
| EB | Exchange bit |
| EE-RL | Exchange element ring link field |
| ET | Element type field |
| FIFO | First-in, first-out |
| HA | Home address |
| HWL | Head-ward link field |
| IE | Indirect element |
| INS. CDS. | Instruction code field |
| MIU1 | Memory interface unit |
| MWD | Multiple word descriptors |
| NR | Number of retries |
| NRL | Next ring link field |
| NS | Number of service field |
| OP. CDE | Operation code field |
| R/I | Real-time/interactive unit |
| R-T/I | Real-time/interactive unit |
| RL | Ring link field |
| RWC | Ring-walk count field |
| SQH | Status queue header |

Additional abbreviations appearing in FIGS. 8, 9, 11 and 13 and the corresponding unabbreviated designations or definitions are summarized as follows: :

FIGURE 8

L — Lock bit which, when present, indicates that the element is being operated on by an IOM and other IOM's are thereby locked out.

NO. OF IOMS — Number of input-output modules sharing the exchange.

IOE — Indicates that associated IO channel has been terminated due to an error condition.

REQ. CT. — Record of the number of IO requests.

ER — End ring bit — when present, indicates that associated device is the last device on an exchange.

UIC — Specifies the use of the indicated channel.

QDE — Queuer device element.

TR —Translate: specifies code translation requirements.

INB — Interrupt bit, when present, specifies whether or not the originating process is to be notified upon completion of the IO operation.

EXE — Indicates that this descriptor has been executed and is now a result descriptor.

IMPE — Indicates detection of an error during the initiation of general device queue element.

RD. BYTE CT. — Result descriptor byte count.

L1 ADDR. — Main (level 1) memory address of the first bit in the field.

INT MOD NO. — Address of processor or I/O module to be interrupted in case of error.

DEV. BYTE LEN — Device byte length.

QUE'R OP CODE — Queuer's operation code.

PTS — PCI terminates state

PTA — PCI terminate register available

TRM — Translator requests MWI

MWA — MWI available

MDR — MWI data ready

MR (00–29) — MWI result descriptor, bits 00 to 29

RR (00–29) — DFTG error request result descriptor, bits 00 to 29

MCS (0–7) — MWI channel and status, bits 0 to 8

MTS — MWI terminate state

MTA — MWI terminate register available

MW (00–27) — MWI word selected by queuer, bits 00 to 27

MSB — MWI strobe

MLA — MWI last access

TRD — Translator requests DCI

DCA — DCI available

DDR — DCI data ready

DR (00–29) — DCI result descriptor, bits 00 to 29

DCS (0–4) — DCI channel and status, bits 0 to 4

DTS — DCI terminate state

DTA — DCI terminate register available.

S1–S4 — Service bits which specify information related to data service.

DISK BYTE LEN — Disk byte length.

DEV OP CODE — Device operation code.

INS. FIELD — Instruction field.

FIGURE 9

T — Type bit which identifies request as fetch or store.

S — Specifier bit identifies operation as either single word or multiple word.

J — Justification bit where least significant bit is transferred to least significant bit position (right justification) or to most significant bit position (left justification).

L — Link bit which indicates that field to be transferred is contained in more than one memory module.

M — Specifies whether or not the field that has been transferred should be locked out to other requests.

P1 — Odd parity bit.

FIGURE 11

PCI — Peripheral controller interface
MWI — Multiple word interface
DCI — Data communications interface
TRP — Translator requests PCI
PCA — PCI available
PDR — PCI Data ready
PR (00–29) — PCI result descriptor, bits 00 to 29
PCS (0–8) — PCI channel and status, bits 0 to 8

FIGURE 13

TD (00–64) — Translator data, bits 00 to 64
TA (00–45) — Translator address, bits 00 to 45
TPR — Translator priority request
TRQ — Translator request
TAK — Translator acknowledge
TFS — Translator fail strobe PD (00–64) — PCI data, bits 00 to 64
PA (00–45) — PCI address, bits 00 to 45
PRQ — PCI request
PAK — PCI acknowledge
PFS —PCI fail strobe
MD (00–64) — MWI data, bits 00 to 64
MA (00–45) — MWI address, bits 00 to 45
MRQ — MWI request
MAK —MWI acknowledge MFS — MWI fail strobe
DD (00–64) — DCI data, bits 00 to 64
DD (00–45) — DCI address, bits 00 to 45
DRQ —DCI request
DAK — DCI acknowledge
DFS — DCI fail strobe.

Of course many variations and modifications of the subject invention are possible in light of the above teachings. It is, therefore, to be understood that within the scope of the appended claims the invention may be practiced otherwise than as specifically described.

We claim:

1. A multiple channel input/output control system for use in a data processing system having a system memory, a plurality of controllable input/output devices connected to a peripheral exchange for at least one class of data throughput, and system interconnection means, said control system comprising:

data transfer means having a plurality of input/output channels connected to each peripheral exchange, each of which can be selectively coupled through the associated exchange to any of the associated input/output devices, program translating means comprising means for constructing information transfer descriptors for selected channels from input/output program elements for individual devices and means for designating which input/output channel will be assigned to each input/output transfer depending upon channel availability at transfer initiate time, data service means coupled to the translating means and to the data transfer means for effecting the input/output information transfers described by the descriptors constructed by the translating means, and memory interface means coupled to the translating means and to the data service means and having terminals connectable to the system memory for the exchange of input/output program elements and input/output data with it.

2. The input/output control system of claim 1 wherein the input/output channel designating means comprises means for obtaining exchange program elements from system memory locations identified by the device program elements and indicating which input/output channels are connected for transferring data to or from the input/output devices to be activated and means for selecting one of those channels which are available at initiate time for assignment to each information transfer.

3. The input/output control system of claim 1 in which the means for constructing information transfer descriptors comprises means for obtaining input/output job program elements from system memory locations identified by the device program elements and means for assembling transfer descriptors from information so obtained.

4. The input/output control system of claim 1 for use in a data processing system having an auxiliary mass memory in addition to the main system memory, the data service means comprising means for effecting device-to-device and device-to-mass memory transfers independent of system processor intervention and means for effecting interactive/time demand transfers also independent of system processor intervention.

5. The input/output control system of claim 1 wherein the transfer descriptor constructing means comprises means indicating which input/output devices are active and which devices are inactive and means responsive to device program elements for one device to access device program elements for another device and to queue device job program elements for it.

6. In an information processing system comprising a system memory, a plurality of input/output devices connected to at least one peripheral exchange and data processing means, an input/output control system including a plurality of control modules each comprising:

multiple channel data transfer means having at least one input/output channel connected to each peripheral exchange and capable of being coupled selectively to individual ones of the associated input/output devices for information transfers, means for assembling information transfer descriptors for selected channels from device program elements specifying input/output transfers to be performed by individual devices, means coupled to the descriptor assembly means responsive to exchange program elements identified by the device program elements for selecting at initiate time an available one of the input/output channels connected between said data transfer means and the exchange for the input/output device to be activated, data service means coupled to the data transfer means for controlling the transfer of input/output data as described by the information transfer descriptors, and memory interface means coupled to the descriptor assembling means, the data transfer means and the system memory for the exchange of input/output program elements and input/output data with it.

7. An input/output control system as characterized by claim 6 wherein said program element responsive means comprises means for evaluating indirect exchange elements identified by the device program elements and indicating which control modules are connected to service the devices to be activated and means for accessing the associated exchange program elements if at least one of the respective exchange channels of that control module is available for data transfer to or from the respective devices.

8. The input/output control system of claim 6 wherein the means for assembling information transfer descriptors comprises means for obtaining program elements for input/output tasks from system memory locations identified by the device program elements and means for extracting preselected fields from these input/output program elements for descriptor assembly.

9. The input/output control system of claim 6 in which the program element responsive means comprises means indicating which input/output devices are active and which devices are inactive and the data service means comprises means for effecting device-to-device and interactive/real-time transfers independent of intermediate system processor intervention.

10. In a multiple channel input/output control system for a data processing system having a system memory, a plurality of controllable input/output devices connected to a peripheral exchange for at least one class of data throughout, and system interconnection means, the method of designating which input/output channel will be assigned to each input/output transfer comprising the steps of obtaining exchange program elements from system memory locations identified by program elements for individual input/output devices and indicating which of the channels are capable of transferring data to or from the device to be activated, and selecting one of said channels available at transfer initiate time for assignment to each information transfer.

11. The method of designating input/output channels for information transfers of claim 10 further comprising the step of constructing information transfer descriptors at transfer initiate time for the selected channels responsive to input/output program elements accessed for the devices to be activated.

12. The method of designating input/output channels for information transfers of claim 11 wherein the step of constructing information transfer descriptors comprises obtaining input/output job program elements from system memory locations identified by the device program elements and assembling input/output transfer descriptions from the information so obtained.

13. The method of designating input/output channels for information transfers of claim 10 further comprising the step of responding to predetermined program elements of active devices to access device program elements for other input/output devices and to queue job program elements in association with the device programs for them.

14. The method of programming input/output data transfers in a data processing system having a system memory, a plurality of input/output devices connected to at least one peripheral exchange, and a multiple channel input/output subsystem, comprising storing program elements for the input/output devices in the system memory identifying data transfer programs to be implemented and executed by the input/output system via channels available at transfer initiate time, and storing exchange program elements also identified by the device program elements and indicating which of the channels are connected for transferring data to or from the input/output devices to the activated.

15. The method of programming input/output data transfers in a data processing system of claim 14 further comprising storing indirect exchange elements identified by device program elements and indicating which input/output control modules are connected for servicing the device to be activated to be accessed for enabling input/output modules available for data transfer with the device at initiate time.

16. The method of implementing programs for input/output data transfers in a multiple channel input/output subsystem of a data processing system having a system memory, a plurality of input/output devices connected to at least one peripheral exchange and system interconnection means, comprising the steps of selecting an input/output channel from those identified as being connected for data transfer with the device by the associated exchange program element, and constructing information transfer descriptors for the selected channel responsive to input/output program elements accessed for the device to be activated.

17. The method of implementing programs for input/output data transfers in a multiple channel input/output subsystem of claim 16 comprising evaluating indirect exchange elements identified by the device program elements and indicating which input/output control modules are connected to service the devices to be activated and accessing the associated exchange program element by the input/output module having an exchange channel available for data transfer with the device at initiate time.

18. A multiple channel data transfer processing system for independently controlling input/output information transfers in a data processing system having a system memory and a plurality of input/output devices connected to a peripheral exchange for at least one class of data throughout, comprising program translating means including means for assigning an input/output channel available at initiate time for each data transfer to be performed and means for constructing information transfer descriptors for the selected channels from input/output program elements only specifying the data transfer jobs for particular devices, data service means coupled to the translating means and having a plurality of input/output channels connected to each peripheral exchange for effecting the data transfers defined by the descriptors constructed by the translating means, and memory interface means coupled to the translating means and to the data service means and having terminals for exchanging input/output program elements and input/output data with the system memory.

19. The data transfer processing system of claim 18 wherein the channel assigning means of the program translating means comprises means for obtaining exchange program elements from system memory locations identified by the input/output device program elements indicating which input/output channels are connected for transferring data to or from the input/output devices to be activated and means for selecting one of those channels which are available at process initiate time for assignment to the information transfers.

20. The data transfer processing system of claim 18 wherein the descriptor constructing means of the program translating means comprises means for obtaining input/output job program elements from system memory locations identified by the input/output device program elements and means responsive to job program elements for one device to access device program elements for another device and to queue input/output job program elements for it.

* * * * *

PO-1050
(5/69)

UNITED STATES PATENT OFFICE
CERTIFICATE OF CORRECTION

Patent No. 3,675,209 Dated July 4, 1972

Inventor(s) Joseph C. Trost et al

It is certified that error appears in the above-identified patent and that said Letters Patent are hereby corrected as shown below:

In the Abstract, line 1, change "channel" (second occurrence) to -- control --; line 5, change "translational" to -- translator --.
Col. 2, lines 14 and 37, change "throughout" to -- throughput --.
Col. 3, line 46, change "throughout" to -- throughput --.
Col. 4, line 32, after "number" change "an" to -- as --.

Signed and sealed this 10th day of April 1973.

(SEAL)
Attest:

EDWARD M. FLETCHER, JR.
Attesting Officer

ROBERT GOTTSCHALK
Commissioner of Patents